(12) United States Patent
Xiao et al.

(10) Patent No.: US 7,729,977 B2
(45) Date of Patent: Jun. 1, 2010

(54) METHOD AND SYSTEM FOR GROUPING MERCHANDISE, SERVICES AND USERS AND FOR TRADING MERCHANDISE AND SERVICES

(75) Inventors: Quan Xiao, 110 Hollis Ave., Quincy, MA (US) 02171; Meimei Zhao, 110 Hollis Ave., Quincy, MA (US) 02171

(73) Assignees: Quan Xiao, Quincy, MA (US); Meimei Zhao, Quincy, MA (US)

( * ) Notice: Subject to any disclaimer, the term of this patent is extended or adjusted under 35 U.S.C. 154(b) by 360 days.

(21) Appl. No.: 11/504,339

(22) Filed: Aug. 15, 2006

(65) Prior Publication Data
US 2007/0043651 A1    Feb. 22, 2007

Related U.S. Application Data

(60) Provisional application No. 60/708,755, filed on Aug. 17, 2005.

(51) Int. Cl.
G06Q 40/00    (2006.01)
(52) U.S. Cl. .......................................... 705/37; 705/38
(58) Field of Classification Search .............. 705/37–38
See application file for complete search history.

(56) References Cited

U.S. PATENT DOCUMENTS

| | | | |
|---|---|---|---|
| 4,789,928 A | 12/1988 | Fujisaki | |
| 5,136,501 A | 8/1992 | Silverman et al. | |
| 5,283,731 A | 2/1994 | Lalonde et al. | |
| 5,285,383 A | 2/1994 | Lindsey et al. | |
| 5,526,479 A | 6/1996 | Barstow et al. | |
| 5,794,207 A | 8/1998 | Walker et al. | |
| 5,845,265 A | 12/1998 | Woolston | |
| 5,890,138 A | 3/1999 | Godin et al. | |
| 5,960,411 A | 9/1999 | Hartman et al. | |
| 6,012,045 A | 1/2000 | Barzilai et al. | |
| 6,029,141 A | 2/2000 | Bezos et al. | |
| 6,085,176 A | 7/2000 | Woolston | |
| 6,202,051 B1 | 3/2001 | Woolston | |
| 6,249,772 B1 | 6/2001 | Walker et al. | |
| 6,266,652 B1 | 7/2001 | Godin et al. | |
| 6,285,987 B1 | 9/2001 | Roth et al. | |
| 6,311,178 B1 * | 10/2001 | Bi et al. | 707/3 |
| 6,317,727 B1 | 11/2001 | May | |
| 6,421,653 B1 * | 7/2002 | May | 705/36 R |
| 6,754,636 B1 | 6/2004 | Walker et al. | |
| 6,856,967 B1 | 2/2005 | Woolston et al. | |

* cited by examiner

*Primary Examiner*—Thu Thao Havan
(74) *Attorney, Agent, or Firm*—Quan Xiao

(57) ABSTRACT

This method groups multiple merchandises (products/services) and multiple traders (buyer/sellers/carriers) that share similar properties with a Merchandise Group ID (MGID) and a User Group ID (UGID), respectively. Each MGID and UGID represents one Merchandise Group and Trader Group, respectively. Different MGIDs and UGIDs represent different merchandise and trader groups. The method also utilize a multi-party matching mechanism to trade Merchandise Groups among Trader Groups by having grouped buyers/sellers/carriers place bid/ask/cAsk offers on both the merchandise and any shipping services required to fulfill the transaction. Based on offers received, the system calculates Gap Values in real-time to determine if deals can be closed. Like stock tickers, MGID enables grouped merchandise to be traded like stocks. UGID enables grouped traders to trade desired merchandise with acceptable counterparties through matching both MGIDs and UGIDs. Based on the grouping, matching and gap value calculating mechanism, this method changes "Instance Trading" into "Group Trading".

33 Claims, 28 Drawing Sheets competing and peers

Fig 1A   Trading System

Fig 1B   Illustration of table structure and relationship of server database

| UPC/EAN/ISBN/ISSN | Image | Rating | Status | Packing |
|---|---|---|---|---|
| ||||||| 0 12345 67890 5 | ◉ 🍳<br>○ 👟<br>○ ✂ | ○ 5<br>◉ 4<br>○ 3<br>○ 2<br>○ 1<br>○ NA | ◉ New<br>○ MINT<br>○ Used<br>○ Antique | ◉ Pk of 1<br>○ Pk of 2<br>○ Pk of 6<br>○ Pk of 12 |

| Currency | Excution Time | Shipping & Delivery | |
|---|---|---|---|
| ◉ $<br>○ £<br>○ RMB<br>○ DM<br>○ €<br>○ F<br>○ ¥<br>○ Rs | ○ At once<br>◉ 1mo<br>○ 3mo<br>○ 6mo<br>○ 1yr | ○ Fedex<br>◉ UPS<br>○ DHL<br>○ USPS<br>○ Other Tracking<br>○ NoTrack<br>○ Pick up | ○ OverNight<br>○ 1-2Day<br>◉ 3-5Day<br>○ 7Day<br>○ 7-10Day<br>○ >10Day |

| Manufacture Warranty | | Return Policy | |
|---|---|---|---|
| ○ Exchange<br>◉ Repair<br>○ No Warranty | ○ LifeTime<br>◉ 5yr<br>○ 3yr<br>○ 2yr<br>○ 1yr | ○ Full Refund<br>◉ -SH Fee<br>○ -Restocking<br>○ Exchange Only<br>○ As It Is | ○ 1wk<br>○ 2wk<br>◉ 1mo<br>○ 3mo<br>○ 6mo<br>○ >6mo |

Fig 2

Property page for Encoding of merchandise GID

| Type | Time of Registry | N% Pos Fdbk | $% Pos Fdbk |
|---|---|---|---|
| ○ Manufacture | ○ >3r | ○ >95% | ○ >95% |
| ◉ Internet & Local Store | ◉ >1yr | ◉ >90% | ◉ >90% |
| ○ Internet Store | ○ >6mo | ○ >85% | ○ >85% |
| ○ Local Store | ○ >3mo | ○ >80% | ○ >80% |
| ○ Individual | ○ >1mo | ○ <80% | ○ <80% |
|  | ○ <1mo | ○ NA | ○ NA |

| Num of Transaction | $ of Total Transaction | $ of Past Mo Transaction | $ per Transaction |
|---|---|---|---|
| ○ <10 | ○ >50000 | ○ >2000 | ○ >1000 |
| ◉ <50 | ◉ >10000 | ◉ >1000 | ◉ >500 |
| ○ <100 | ○ >5000 | ○ >500 | ○ >100 |
| ○ <500 | ○ >1000 | ○ >200 | ○ >20 |
| ○ <1000 | ○ >100 | ○ >100 | ○ <20 |
| ○ <5000 | ○ <100 |  |  |
| ○ >5000 |  |  |  |

Fig 3

Demo property page for Encoding of seller GID

| Type | Membership Level | Time of Registry | N% Pos Fdbk | $% Pos Fdbk |
|---|---|---|---|---|
| ○ Distributor | ○ Diamond | ○ >3r | ○ >95% | ○ >95% |
| ○ Retailer | ○ Plantiun | ◉ >1yr | ◉ >90% | ◉ >90% |
| ○ Busi. user | ◉ Gold | ○ >6mo | ○ >85% | ○ >85% |
| ◉ Indi. user | ○ Silver | ○ >3mo | ○ >80% | ○ >80% |
|  | ○ Green | ○ >1mo | ○ <80% | ○ <80% |
|  |  | ○ <1mo | ○ NA | ○ NA |

| N of Transaction | $ of Total Transaction | $ of Past 3Mo Transaction | $ per Transaction |
|---|---|---|---|
| ○ <10 | ○ >50000 | ○ >2000 | ○ >1000 |
| ◉ <50 | ◉ >10000 | ◉ >1000 | ◉ >500 |
| ○ <100 | ○ >5000 | ○ >500 | ○ >100 |
| ○ <500 | ○ >1000 | ○ >200 | ○ >20 |
| ○ <1000 | ○ >100 | ○ >100 | ○ <20 |
| ○ <5000 | ○ <100 |  |  |
| ○ >5000 |  |  |  |

$% Immediate Downpay
○ Full
◉ 80%
○ 50%
○ 25%
○ 10%
○ 5%
○ 0

Installment
○ BankWire
◉ CC
○ Paypal
○ Google
○ Other 3rd Party
○ Check
○ Unlisted

Fig 4

Demo property page for encoding bidder GID

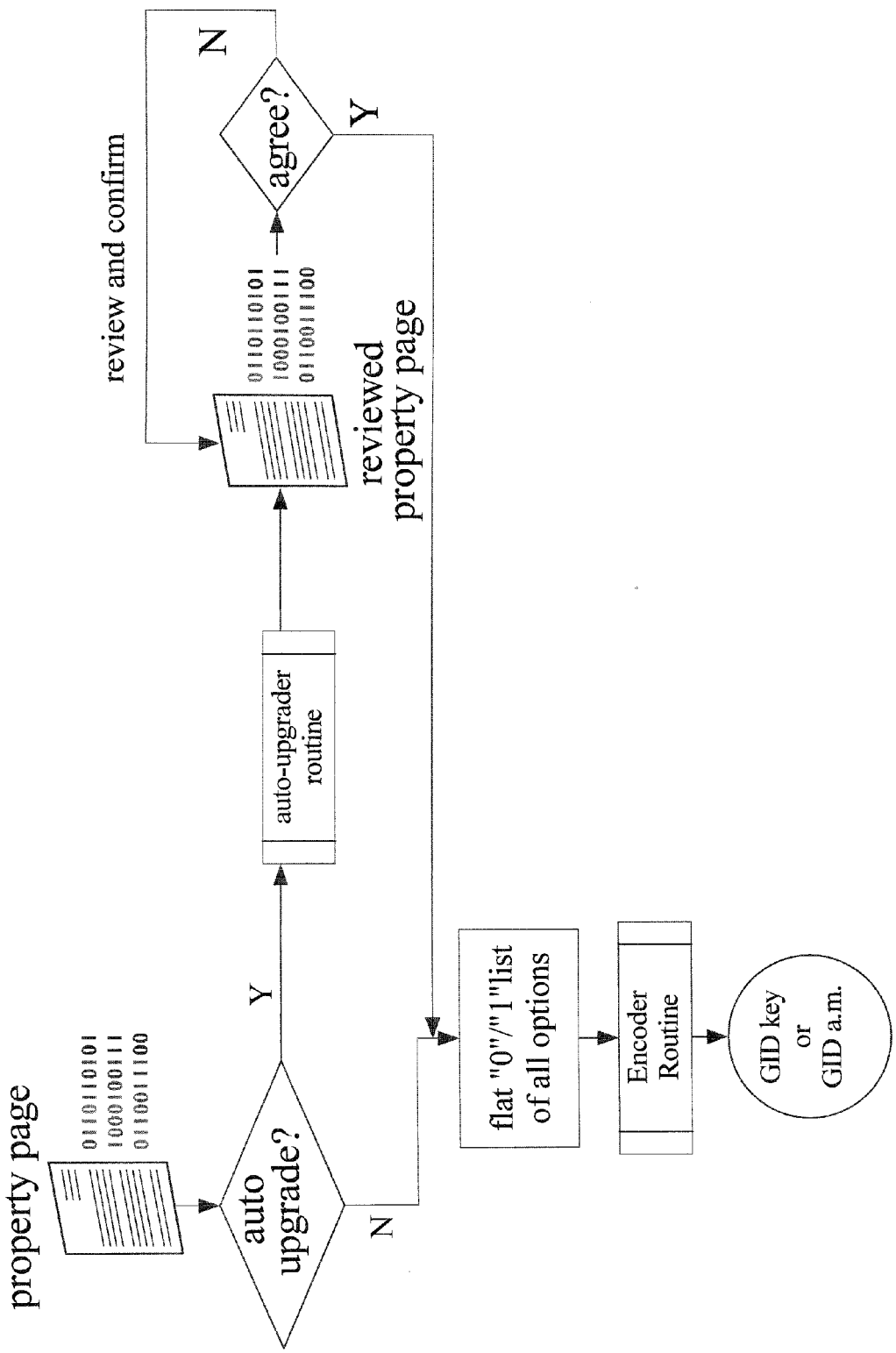
Fig 5A GID Encoding procedure

Encode Routine of Fig 5A

Property and GID with
Exact Match and Auto Upgrade

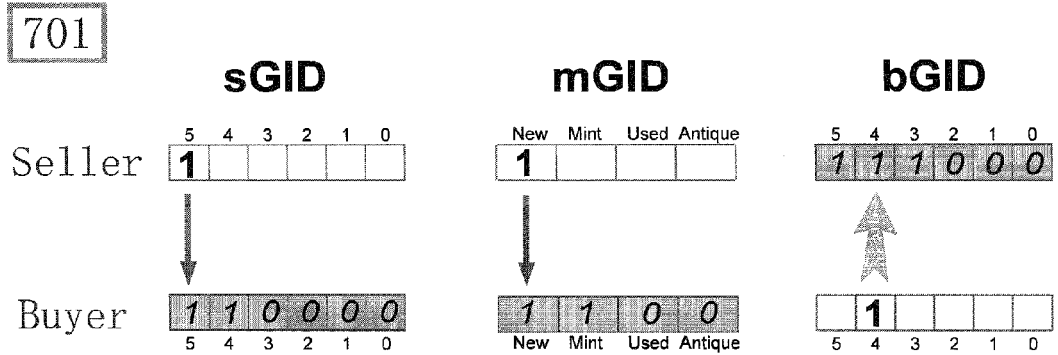
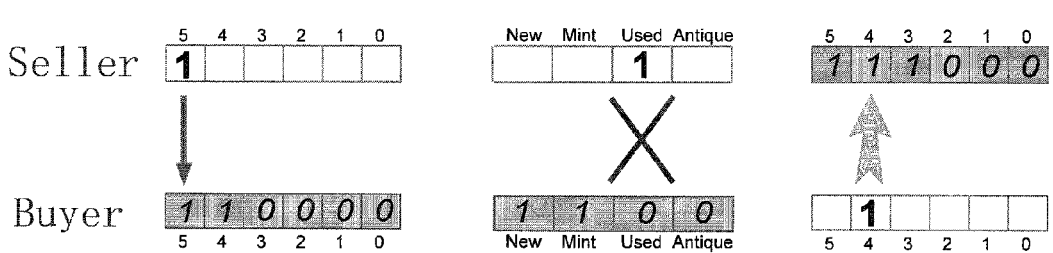
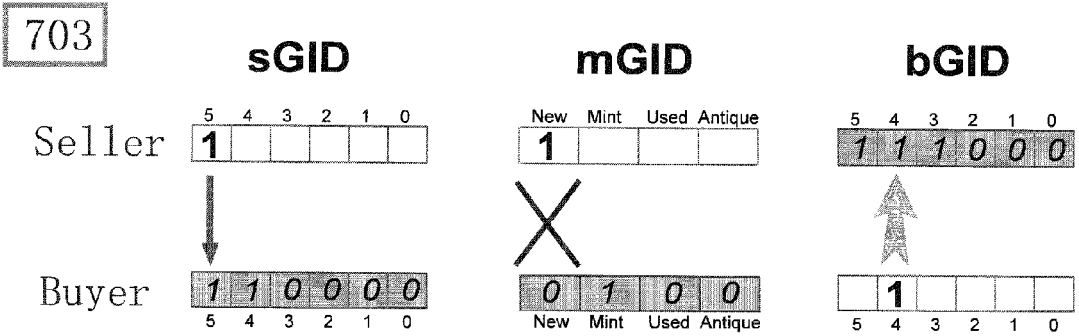
Fig7, Key vs. Acceptance Mask Matching Mechanisim of GIDs between Sellers and Buyers formular to calc Total Fees

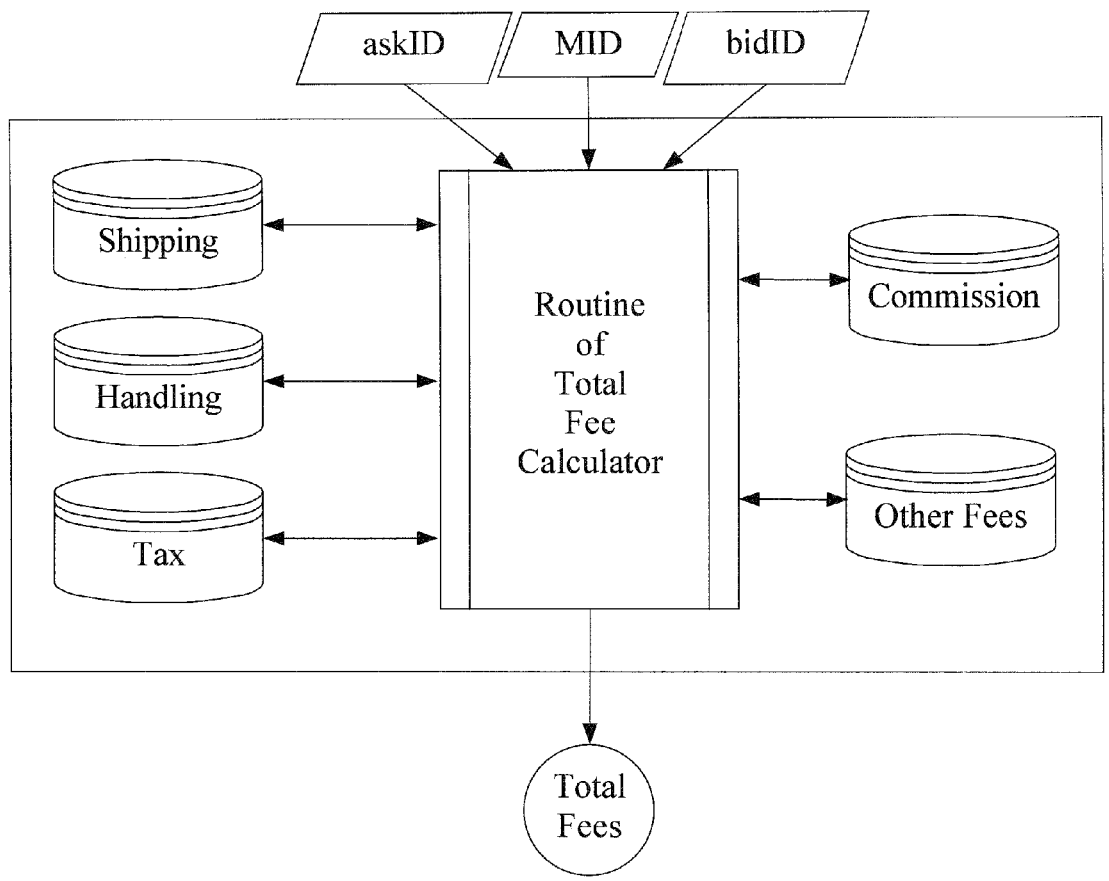
fig8B   fee_calculator grouping and subset records of all offers on a certain PID competing and peers Thesholding of ask prices Interface demo for a bidder( buyer )

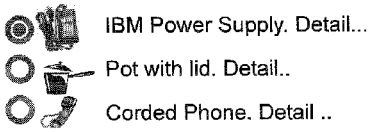
Fig 13, continued Interface for bidder

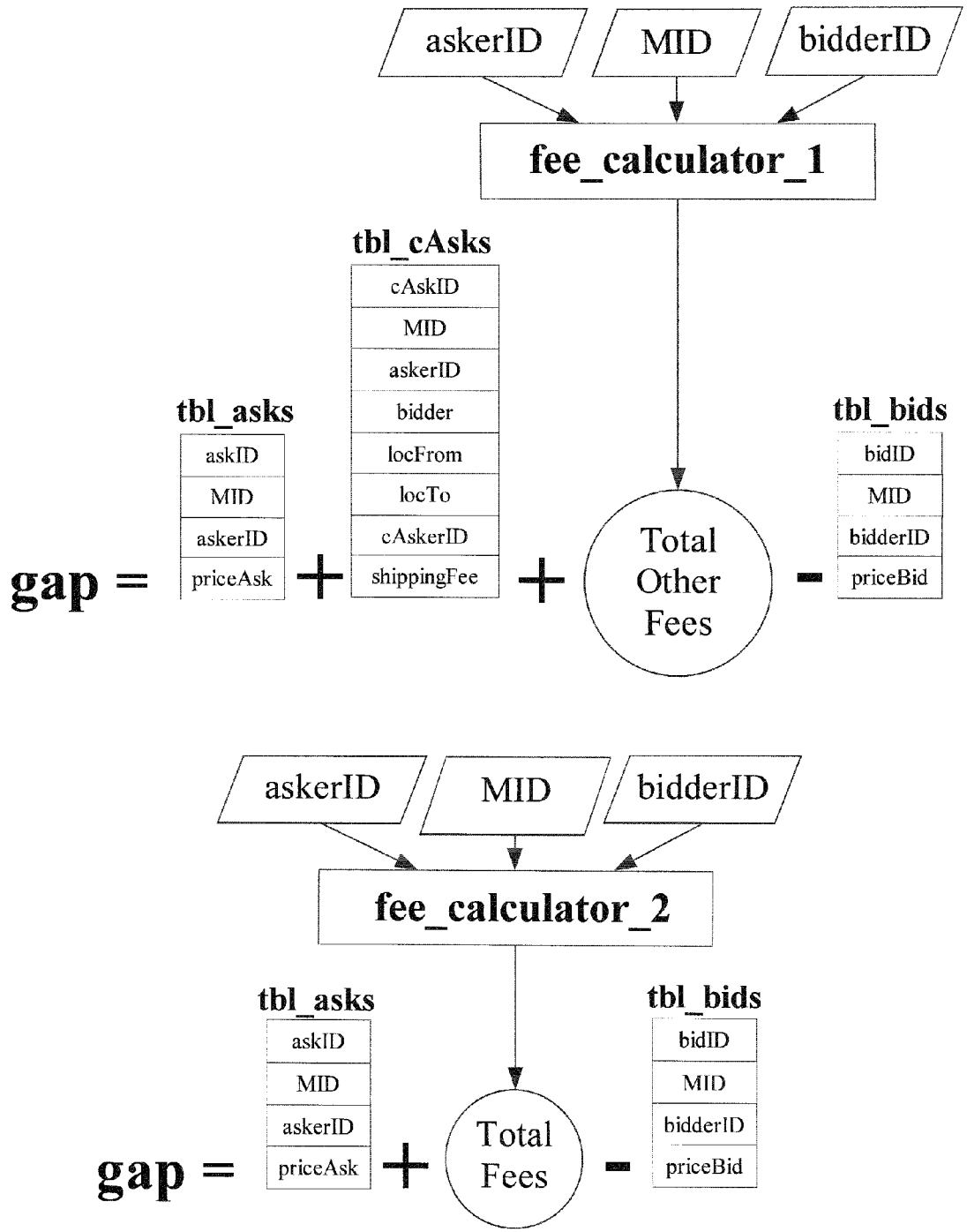
Fig14. Gap formulars

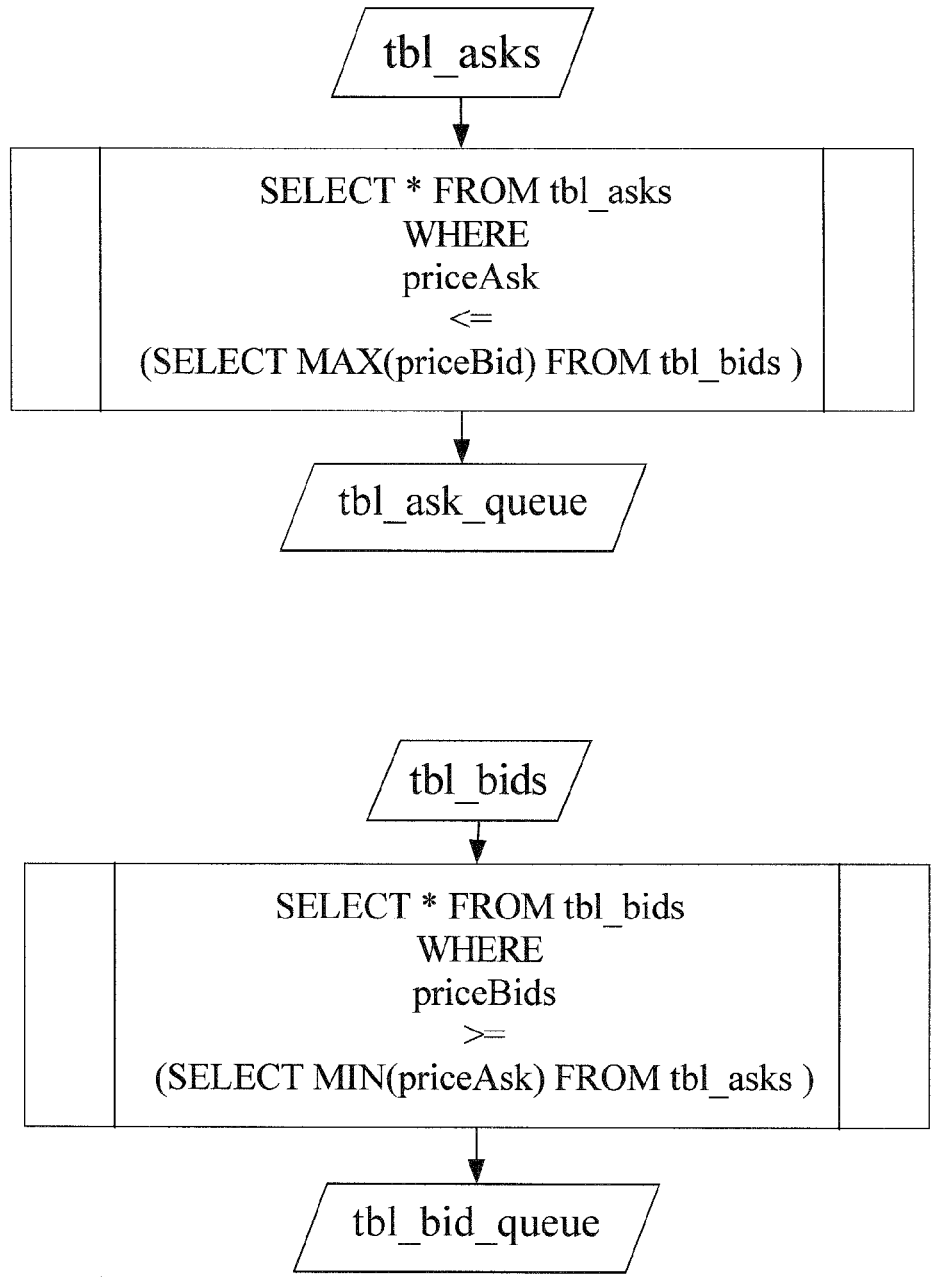
Fig15. Pre-filtering of very large offer queus

| Quan | 2 | Log Out | Sell Buy Ship Browse MyTrade Forum Home Help Admin |

Porto Folio of xq ( quan@itrade.com )
☑ Show My Ask PackingMethod

| askID | askerID | PIDAsk | MGID_Key | volumeAsk | priceAsk | timeAsk | shipFrom |
|---|---|---|---|---|---|---|---|
| 45 | 1 | 1 | _1000000_10000000_1000 | 4 | 999.9990 | 05-12-21 02:15:26 | 10032 |
| 46 | 1 | 1 | _0100000_10000000_0001 | 1 | 955.2500 | 05-12-21 02:12:55 | 10032 |
| 47 | 1 | 2 | _1000000_01000000_0100 | 1 | 125.0000 | 05-12-12 02:13:09 | 10032 |
| 48 | 1 | 1 | _1000000_01000000_0100 | 3 | 2.0000 | 05-12-12 02:23:09 | 10032 |

☑ Show My Bid

| bidID | bidderID | PIDBid | MGID_b_AM | volumeBid | priceBid | timeBid | shipTo |
|---|---|---|---|---|---|---|---|
| 6 | 1 | 2 | _0111011_11111110_1100 | 1 | 500.0000 | 05-12-12 02:33:33 | 10032 |

☐ Show My CAsk

Fig 16    Default Page

| askID | askerID | PIDAsk MGID_key | volumeAsk | priceAsk | shipFrom | timeAsk | | |
|---|---|---|---|---|---|---|---|---|
| 45 | 1 | 1000000_10000000_1000_4 | | 999.9900 | 10032 | 05-12-21 02:15:26 | Edit | Delete |
| 46 | 1 | 0100000_10000000_0001_1 | | 955.2500 | 10032 | 05-12-21 02:12:55 | Edit | Delete |
| 48 | 1 | 1000000_01000000_0100_3 | | 2.0000 | 10032 | 05-12-12 02:23:09 | Edit | Delete |
| 49 | 4 | 1000000_10000000_1000_1 | | 1105.0000 | 95000 | 05-12-13 23:24:41 | Edit | Delete |

Fig 17   ask Page

Fig 18  bid Page

Fig 19 cAsk Page

| productID | barCode | brand | name | model | spec | userRating | Len1 | len2 | len3 | Weight | |
|---|---|---|---|---|---|---|---|---|---|---|---|
| 1 | 111111111111 | Canon | DSLR | EOS-20D | 7.9M px, 1.6X | 5 | 0.4 | 0.3 | 0.2 | 1.5 | Edit |
| 2 | 3525342342555 | GE | scanner | ss-111 | all-in-one, usb2 | 3.8 | 0.4 | 0.5 | 0.3 | 3.2 | Edit |
| 3 | 4354534453454435 | iRiver | mp3 player | IFP-790 | 256M USB2 | 4.5 | 0 | 0.1 | 0.1 | 0.2 | Edit |
| 4 | 444535 | IBM | thinkpad | X | 14', P4, 4 lb | 4.2 | 0.4 | 0.3 | 0 | 1.9 | Edit |
| 5 | 45545352 | HP | InkJet printer | DJ 3820 | 4 color, photo | 3.9 | 0.2 | 0.4 | 0.3 | 4.2 | Edit |
| 6 | 4526746623464326 | Belkin | Wireless Router | WR-4000 | 4 port, 802.11b/g | 4.6 | 0.2 | 0.1 | 0 | 0.4 | Edit |
| 8 | 12345678 | Apex | Apex TV | apex 29HD | | | 0.3 | 0.2 | 0.1 | | Edit |
| 13 | 111 | Maxtor | Maxtor Hard drive | 120GB | | | 0.2 | 0.3 | 0.1 | | Edit |
| 14 | 88888 | GreatWall | DVD-RW | FastLight | 50x | | 0.2 | 0.2 | 0.1 | | Edit |
| 15 | 122245 | hehe | TryIt | | | | | | | | Edit |
| 16 | 888999888 | 同仁堂 | 牛黃解毒片 | 7x24 | | | 0.1 | 0.1 | 0.1 | | Edit |
| 17 | 12345 | Altec | Speaker | | | | 0.5 | 0.4 | 0.2 | | Edit |

Fig 20   Product Page

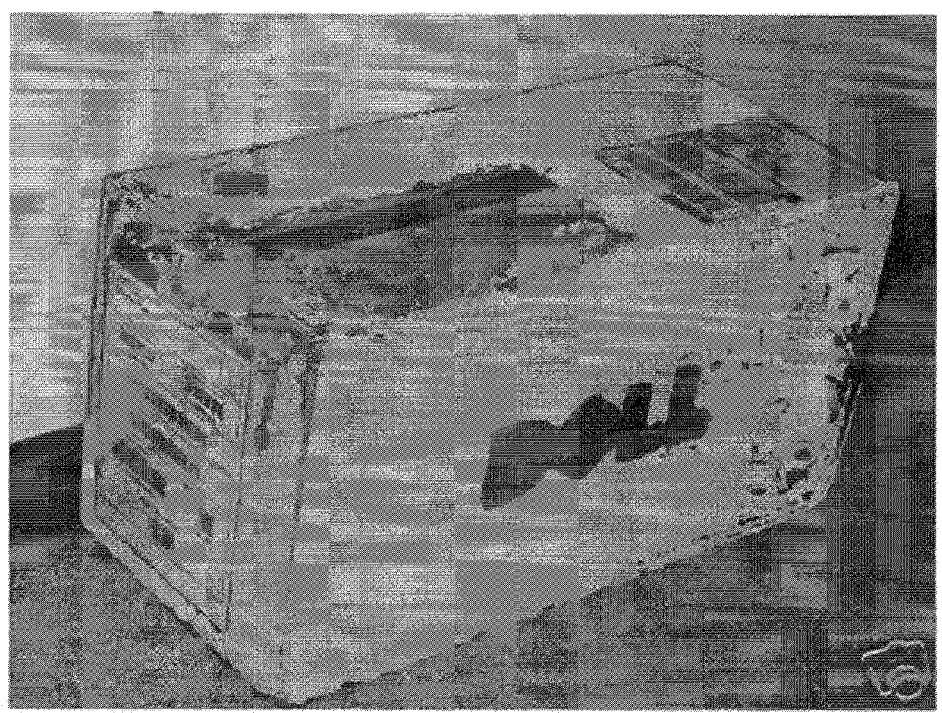
Fig 21 add_new_Product

| MERCHANDISE PROPERTIES ☐ IsKey 0 | |
|---|---|
| Reset  Preview  _1111000_11100100_1110  Submit | |
| 1111000 Merch Status | 5001 |
| ☑ New/Manufacure packing | 5011 |
| ☑ Refurbished | 5012 |
| ☑ OpenBox | 5013 |
| ☑ barely used, almost new | 5014 |
| ☐ used | 5015 |
| ☐ heavyly use/worn out | 5016 |
| ☐ Collectables/Antique | 5017 |
| 11100100 Consumer Rating | 5002 |
| ☑ 5 Stars | 5021 |
| ☑ 4 Stars | 5022 |
| ☑ 3 Stars | 5023 |
| ☐ 2 Stars | 5024 |
| ☐ 1 Stars | 5025 |
| ☑ No Rating | 5026 |
| ☐ -1 Star | 5027 |
| ☐ -2 Stars | 5028 |
| 1110 Manufacture Warrenty | 5003 |
| ☑ Life Time | 5031 |
| ☑ 10 years | 5032 |
| ☑ 5 years | 5033 |
| ☐ 3 years | 5034 |

Fig 22  GID_Encoder Options

Show All Candidate List

| askID | bidID | cAskID | volumeAsk | volumeBid | priceAsk | priceBid | shippingFee | gap |
|---|---|---|---|---|---|---|---|---|
| 45 | 7 | 6 | 4 | 2 | 999.9900 | 1105.0000 | 8.5000 | -96.5100 |
| 45 | 5 | 1 | 4 | 1 | 999.9900 | 1050.6000 | 5.6500 | -44.9600 |
| 45 | 5 | 5 | 4 | 1 | 999.9900 | 1050.6000 | 6.0000 | -44.6100 |
| 45 | 5 | 2 | 4 | 1 | 999.9900 | 1050.6000 | 10.0100 | -40.6000 |

Show Closed Deals
4 item(s) sold by 3 orders

| offerID | askID | bidID | cAskID | volumeAsk | volumeBid | priceAsk | priceBid | shippingFee | gap | tagAsk | tagBid | nSold |
|---|---|---|---|---|---|---|---|---|---|---|---|---|
| 1 | 45 | 7 | 6 | 4 | 2 | 999.99 | 1105 | 8.5 | -96.51 | 2 | 3 | 2 |
| 2 | 45 | 5 | 1 | 2 | 1 | 999.99 | 1050.6 | 5.65 | -44.96 | 2 | 3 | 1 |
| 3 | 45 | 5 | 5 | 1 | 1 | 999.99 | 1050.6 | 6 | -44.61 | 3 | 3 | 1 |

Show Detail Matching Log

| offerID | askID | bidID | cAskID | volumeAsk | volumeBid | priceAsk | priceBid | shippingFee | gap | tagAsk | tagBid | nSold |
|---|---|---|---|---|---|---|---|---|---|---|---|---|
| 1 | 45 | 7 | 6 | 4 | 2 | 999.99 | 1105 | 8.5 | -96.51 | 2 | 3 | 2 |
| 2 | 45 | 5 | 1 | 2 | 1 | 999.99 | 1050.6 | 5.65 | -44.96 | 2 | 3 | 1 |
| 3 | 45 | 5 | 5 | 1 | 1 | 999.99 | 1050.6 | 6 | -44.61 | 3 | 3 | 1 |
| 4 | 45 | 5 | 2 | 1 | 1 | 999.99 | 1050.6 | 10.01 | -40.6 | 0 | 1 | 0 |

Fig 23   Offer Matcher Page

| Log Out | 2 | Sell Buy Ship Browse MyTrade Forum Home Help Admin |

Final Matched Order
User Detail

| noteID | userID | noteTxt | noteTime | fulfilled |
|---|---|---|---|---|
| 7 | 1 | link to other Web Services... | 05-12-22 03:14:23 | |
| 3 | 1 | Keep user offer opened. | 05-10-29 22:41:15 | |
| 6 | 1 | image upload for product | 05-12-11 00:20:34 | 1 |
| 5 | 1 | server independent | 05-12-02 01:50:22 | 1 |
| 4 | 1 | upgrade database GIDs from int to nvarchar | 05-10-29 22:41:39 | 1 |
| 2 | 1 | bugs in asks and bids | 05-10-29 22:40:32 | 1 |
| 1 | 1 | string Matching | 05-10-15 11:56:07 | 1 |

Admin Page

Fig 24

| | | | Log Out | Sell Buy Ship Browse MyTrade Forum Home Help |
|---|---|---|---|---|
| Quan | | 2 | | |

Choose My AskID: 45 ▼ 1

Review Procuct info (unitSz&Wt) for the above ask offer and Choose shiping Volume

| | PIDAsk | shipVol | unitLen1 | unitLen2 | unitLen3 | unitWeight |
|---|---|---|---|---|---|---|
| Select | 1 | 1 | 0.4 | 0.3 | 0.2 | 1.5 |
| Select | 1 | 2 | 0.4 | 0.3 | 0.2 | 1.5 |

Shipping Method for PID and volShip Selected above

| | shippingMethodID | lenPk1_m | lenPk2_m | lenPk3_m | weightPk_kg |
|---|---|---|---|---|---|
| Select | 6 | 1 | 3 | 3 | 4 |
| Select | 7 | 1 | 0.5 | 3 | 4 |
| Select | 13 | 1 | 2 | 3 | 4 |

1

Packing MethodID: 7

Len1(m) 1
Len2(m) 0.5
Len3(m) 3
weight(kg) 4

Shipping Method Previously used by Me For this Product

| PIDAsk | volShip | timeLastUse | shippingMethodID | askerID |
|---|---|---|---|---|
| 1 | 2 | 05-12-22 00:55:31 | 6 | 1 |
| 1 | 2 | 05-12-14 00:00:05 | 7 | 1 |

Confirm Shipping Method

Use by an asker to decide what packing method he would use for his ask offer.
Packing is based on Product ID and volume to ship.regardless of the zip codes
then get quote through API from ALL carriers for the packingMethod ID, and start/stop zip
codes. These info will be used to build a cAsk Table.

Fig 25 packingMethod Selector Page

METHOD AND SYSTEM FOR GROUPING MERCHANDISE, SERVICES AND USERS AND FOR TRADING MERCHANDISE AND SERVICES

CROSS-REFERENCES TO RELATED CASES

This application is entitled to the benefit of Provisional Patent Application Ser. No. 60/708,755, originally filed on Aug. 17, 2005.

APPENDIX

File List of Compact Disc

This application also contains two copies of CDs, which are identical to each other. It contains the computer source code for the demo algorithm and demo web site. The CD also contains transact-SQL script to re-build the database necessary for running the demos and CSV files that contains the dummy data for the demo database tables. A live demo can be found at http://www.profpro.com/PPA_WEB.

The CD is compatible with PC and Microsoft Windows/MAC OS/UNIX system. The following directory list is also included on the CD as TOC.txt. This list was generated with DOS dir command.

LIST OF ALL FILES ON THIS CD

| Date and Time (YY-MM-DD hh:mm) | Notes | Size(Byte) | File (Folder) Name |
|---|---|---|---|
| Directory of F:\USPTO CD | | | |
| 05-02-15  01:14 | <DIR> | | . |
| 05-02-15  01:14 | <DIR> | | .. |
| 06-02-15  10:25 | <DIR> | | ASP |
| 06-02-15  10:27 | <DIR> | | Matlab |
| 06-01-15  00:17 | | 37 | autorun.inf |
| 06-01-15  00:29 | | 708 | README.html |
| 06-02-15  11:40 | | 12060 | TOC.txt |
| 3 File(s) | | 12805 bytes | |

STATEMENT REGULATING FED R&D

Not applicable.

DESCRIPTION & OPERATION OF MAIN EMBODIMENT

The apparatus and methods disclosed herein reveal a new e-commerce business model and its possible embodiment in a promising but yet to be developed sector of the Internet Economy. By designing a new infrastructure of e-Commerce, this new model will greatly improve and integrate the current price comparison service with the merchandise trading system. Trading of common merchandise (the term "merchandise" can refer to actual merchandise items or services) is now on a "grouped" basis but no longer on an "instance" basis.

Firstly, a new encoding method is designed to categorize merchandises into sub-groups and identify each subgroup with a unique Merchandise Group ID (MGID). MGID works like a stock ticker. It enables also categorized subgroups of bidders/askers, who are identified by their User Group IDs (UGID), to put bid/ask offers on the above said merchandise subcategories and to trade merchandise like trading stocks. This invention provides a new infrastructure and interface to connect and organize consumer merchandise, multiple askers (sellers) and multiple potential bidders (buyers).

Secondly, the new model will create a new marketplace that enable shipping service carriers, such as FedEx, UPS, DHL or USPS, to compete on shipping services in a brand new way. Shipping services are materialized. The shipping service carriers can influence the merchandise market sales by competing on shipping cost for the transportation of merchandise. A lower cost on the shipping service market will boost the transaction on the merchandise market, and vice versa. For this reason, the shipping service carriers will also be referred to as cAsker hereafter. These carriers will be fully integrated and be able to play more active roles in the new trading system.

Thirdly, the new platform will make the market more transparent for common users (e.g., buyers, sellers, shippers—but can be construed as other users of the merchandise trading system). It provides user-friendly interface and tools to help its users to make reasonable price offers and purchasing decisions much easier than what they have to do now through current existing e-Commerce platforms.

Lastly, this new business model will also help to reduce or even prevent non-payment fraud.

BACKGROUND OF THE INVENTION

The present invention is in the field of doing e-commerce. It groups users (buyers, sellers, shippers) to trade grouped merchandise (merchandise items or services) in the way of trading stocks. It facilitates a better interface between multiple askers (sellers) and multiple bidders (buyers). More specifically, instead of being a pure "auction" platform or a "reverse auction" platform, the model will create a true merchandise "trading" platform. The system makes merchandise market operating like the stock market. It groups its users as well as merchandise and identify each group with a group ID (GID). In addition, the model will provide the shipping service carriers with a larger stage to level in the final merchandise transactions by competing shipping fees with each other in an auction-like manner. All the above mentioned features are integrated thus it make the new trading platform more versatile and flexible than any other prior arts.

The prior arts (the dominant ways of trading merchandise online) are either an "auction" model such as eBay.com, uBid.com and Amazon.com, or a "reverse auction" model such as Priceline.com. All of the above mentioned models failed to provide means to establish efficient communication channels between multiple askers and multiple bidders. Neither can those prior arts fully integrate shipping into their system. They are confronted with at least one or even several of following problems:

1) Only asker (seller) can list an item, buyer can't list if there is no seller for that item;
2) Each single piece of identical products (or services) is repeatedly listed without grouping, resulting in identical (or essentially identical) items listed repeatedly by different users or even by the same user. Users are overwhelmed with pages of repetitive useless information;
3) Users are lack of the freedom of withdrawing (cancel) their offers even though they have changed their mind before the deal is closed and a contract is bound;
4) Non-payment fraud that bother the sellers a lot;
5) Asymmetric information. It is difficult for individual users, especially those inexperienced occasional users, to find the true value of merchandise. They may end up with mis-evaluating the current market price for the listed items. As a result, unless he spends lots of time doing research, inexperienced user may face the risk of buying something overpriced or sell something undervalued;

6) Users have to jump back and forth among pages to calculate additional expenses such as a shipping and handling (S/H fee), insurance fees, commission fees and tax fees. Furthermore, they may still miss some hidden charges due to the fact that the prior arts do not provide users with the "Total Final" cost (for buyer) or profit (for seller). Users may end up with engaging in a disadvantaged trade based on the above said incomplete information;

7) Carriers (shipping service providers) do not play a strong and active role in the trading system (game) as they should. They exist rather as passive and supportive players. In fact, change in prices of shipping services would have great effect on merchandise trading. In fact, the shippers are not offered the opportunity to bid on shipping arrangements. The prior arts fail to provide the shipping carriers with the platform that the current invention will offer;

8) All prior arts are static. They do not use the full extent of today's computer power and database technology. As a result, they fail to provide an efficient dynamic trading platform that can reflect the market in real time.

9) Users' contact information is not hidden to their counterparties, so they might contact and make deals outside of the server thus make service provider sites lose their income.

10) Sellers can cheat in many ways. He can cheat on price by bidding his own items. He can also cheat on his rating by selling item to himself while without shipping out, after which he can leave himself positive rating and feedback.

To address all of these shortcomings of those prior arts, the present invention disclosed herein has the following objectives and advantages:

SUMMARY OF THE INVENTION

This new system is a real real-time "trading" platform but not just limited to an 'auction' platform nor a "reverse auction" platform. Merchandise would be grouped by MGID (PID plus other properties) and traded in this system freely like trading stocks at stock exchange. All involved users of the system will also be grouped and then matched to their counterparties who can accept each other. It will greatly improve the logistic and exchanging of both new and used merchandise; it will benefit the manufactures, shipping carriers, sellers and its end users.

A more detailed and universal information about merchandise and the market will be revealed to users for them to browse, search, compare and to make their decision of purchasing.

No more repeatedly listed items. All identical/similar instances of products will be combined into one group. This will enable multiple bidders/askers to bid/ask on the merchandise more easily. For each product (PID), offers from all users will first be grouped by MGID/BGID/AGID/CGID into subgroups of candidate offers list by prescreening with introducer routine which would be mentioned in the following text. Within subgroup offers of each PID, offers are compared against each other within the group and sorted by their final gap in prices and in other parameters such as total value of orders, time of offers, etc. Sorted offer queue are then be converted to orders which will bind a contract between the asker (seller), bidder (buyer) and carrier (shipper/cAsker).

When matched offers are found, a deal is made. The transaction can be cleared via common payment method, such as credit cards, wiring, e-check, check or other 3rd party payment services. Payment process should follow the agreement they reached during the bid/ask offers.

Transaction can be first secured by optionally downpaying a portion of the full payment. This amount would be a fixed amount or a certain percentage of the total. Payment should be cleared later in full payment using the above mentioned payment method. This deposit would benefit both seller and buyer.

Bidder and askers bear no obligations on making/modifying/canceling their offers as long as at that time there is no matched deal and the contract is not generated in the trading system. They would therefore be offered the full freedom of entering and leaving the market anytime they want.

Users would have more tools on making their offers, such as by using "market order", "limit order", "stop order". Like those in the stock market. By using the market order, the user is guaranteed to get the current best deal available without bothering to do any research and price comparison. He can also use some scored "percentage price" to avoid offering too much while keep himself a good position of winning the deal.

Bidders can provide sufficient fund to cover partial of the full payment of their bid and authorize to pay the rest to payees right after the deal reached. By paying this security deposit, these bidders are given a special tag by the system, which would be reflected in their BGID. These buyers then can get a higher chance of wining the bid over other bidders who don't provide pre-located deposit funds. This deposit payment also benefits the asker by reducing their risk of non-payment bidders. Askers can adjust their preference of their acceptable risk level and then modify the weight of this priority.

The new system is a dynamic open system where the bid/ask price are no longer constant nor monotonically rising or falling. Instead, the price of certain merchandise can fluctuate up and down like what happens in a stock exchange. The price change reflects the real market value on the fly.

The user can even customize the exercise (execution) time of the transactions to a later time so to get it at a lower cost. They can even bid on some rain checks or coupons like options. This makes people can trade regular merchandise as trading options in the financial market.

Calculate Shipping Handling Fee automatically and dynamically. Driven by database engine, all related fees can be calculated and included automatically in the final offer price. Thus users can make their comparison based on the real cost. Users don't need to find out and calc the hidden fees themselves. This makes our merchandise market place more user-friendly and fair to everyone.

By involving the carriers into the trading system as independent game players, our platform makes it more difficult for the sellers (askers) to cheat on their feedback rating. Because they can no longer sell items to themselves without shipping it out. They now have to pay the real carriers plus commission. If he doesn't ship items out, he will get bad rating from both our system and the carriers, which will result in degrading their AGID_key (rating as an asker).

At the same time of benefiting the bidders and askers of the merchandise market, the shipping dynamic calculation also creates a new online market of shipping services for all carriers. At this shipping service market, they can compete on the shipping fee for predefined grouped shipping service.

This invention also benefits the manufactures or service providers whose products (such as a computer, car, furniture, tickets) or services (such as travel package, service packages, etc) have lots of customizable features. Based on this trading platform, any manufacture can establish its own direct sale system very easily.

Establish an algorithm to match bid/ask offers not solely based on price difference, but also matching more generally by the bidder/asker/carrier's grouping information and by other information such as previous trading behaviors and feedback rating. The ranking system takes into consideration not only their counter party's feedback but also the statistics from the trading server. The ranking will reflect itself in the user or merchandise's GIDs. GID is assigned to users and maintained by the system server. For these reasons, our system can help user to find whatever they want more precisely and more easily.

It is a 24/7 fulltime and global market place. The market is always open and never close. There is neither New York Exchange nor London Exchange, the market use one timing system and time zone independent.

There will be no ending time of a listed item. As long as there is recent trade/offer on that item, it is considered active and won't be removed.

Last trading information (price and volume etc.) for each item can be provide in the format of charts, figures, tables or streamers to the users for further references. Other statistic info, trends and analysis may also be provided.

A certain amount of service fee might be taken from the involved parties of the transaction. It can from the either the asker, bidder or both sides. The charge could be a fixed amount or a percentage of the total transaction. The charge will also be included and reflected in the real final price.

An integrated, multi-criteria, double-ranked, and following-up rating system are used. This new rating system can reflect the users' opinions on merchandise or their counter parties much better than current rating system.

OBJECTIVES & ADVANTAGES

The soul of merchandise trading is to build efficient interaction gateways between all the involved parties, namely: merchandise, askers, bidders, and cAskers (shipment carriers). As shown in FIG. 1A01, there are at least four components in the business chain. Merchandise flows from sellers to buyers via shipping carriers. Each of the four parties is essential for making a transaction go through. Furthermore, although every instance of merchandise (and user) has their unique properties, they all have something in common at the population level, by which they can be categorized into certain groups. Accordingly, the objectives and advantages of the current invention are to establish a new commercial infrastructure that provides sufficient ways to organize the trading transactions by grouping and matching.

Our new infrastructure, instead of trading each instance of merchandise between an instance bidder and an instance asker, trades grouped merchandise between grouped bidders and grouped askers. In addition, the new platform will enable the grouped shipping service carriers to get involved as an independent player to fulfill the final transaction. The invention will change the current "static instance trading" models into a "dynamic group trading" platform.

The current invention would fulfill our goals by:

1) Categorizing and grouping merchandise and services for easier browsing, searching and comparison;

2) Grouping users (bidders/askers/cAskers) into different asker/bidder/carrier categories by evaluating their common properties, qualifications, and their trading behavior history. The evaluation results can then be used as fingerprints (grouping criterion) of that user group, and will be further encoded (integrated) and used for the bidder/asker/cAsker categorization (grouping). All instances within one subgroup can eventually be considered as identical regarding to those grouping criteria.

3) Calculating Shipping Handling Fee automatically and dynamically. Driven by database engine, the new invention will automatically reflect the related shipping service fees in the final offer price. By providing the real final costs to buyers and final profit to sellers, the new invention makes the merchandise market place more transparent, convenient, users friendly and fair.

4) At the same time of benefiting the bidders and askers, the new invention also creates a market of shipping services where shipping carriers can compete on the shipping fees against their peers by bidding for a certain grouped shipping service. In some countries, like USA, the law requires bigger shipping carriers to maintain same rates to all customers and be post on a tariff to limit their liability. These carriers' offers can be obtained by retrieving their real-time quotes through their current existing API, Web Services or other third party Web Services. The returned quote can then be used as their "bidding". The dynamics provided here will enable the carriers' leverage on the deal-matching between askers and bidders when carriers' rate changes. It can enable carriers compete against each other, as well as letting local small carriers or courier service's to compete with major carriers.

5) The new invention benefits manufactures and service providers. Products (such as a car, computer, furniture, air plane ticket) and services (such as travel package or room services) have lots of features that can be customized. Based on this platform, any manufacture or service provider can build its own direct sale system for their predefined and categorized product/service very easily.

6) Automatically calculating all fees. Include SH fees, tax and commissions into costs to provide the bidder/asker the real FINAL cost/profit. Thus the users can make comparison based on the real price without the need of putting extra effort in calculating on their own. In addition, they no longer have the risk of make wrong purchasing decision because of the failure of revealing some hidden charges. This feature benefits all users (asker/bidder/carrier) who are unfamiliar with the market 7) Price is only one of the factors that lead to a purchase transaction. Other factors such as creditability are also essential. People don't like to do business with bad counterparty even their offered price is better. This invention establishes an algorithm to match bid/ask offers not solely based on price differences but also on the bidder/asker/carrier's grouping information. Grouping information reflects its group members' common properties such as their location, method of payment, previous trading behaviors, feedback ratings left by their counterparty and statistics rating from the trading system. The new trading system matches the user groups first, pool those matched groups of users who are willing to deal with each other together, and then perform the price match within the matched groups. This ranking/grouping system helps to convert individual "instances" to "groups" and make the matching more efficient.

8) By providing a deposit (down payment) option in the payment parts, the new platform benefits both askers and bidders. Bidder who pays higher percentage of deposit gets better position in the matching queue. Payees can lower their risk of losing money from non-payers, while payers can increase their chance of wining the bid.

9) Users will have more freedom by put their offer by using "market order", "limit order", "stop order" like those used in stock trading nowadays. Users are free to withdraw their offer any time before a deal is reached and contract is generated.

10) User will have more freedom on and control over the practice (execution) time of their order transaction like trading options and futures on financial market. By choosing a future execution time of their offer, they can get better price on the same item than acquire the delivery right away. This kind of order will also help the manufactures or service providers to schedule their production plans well ahead of time.

11) Basically, unlike eBay or any other current auction service sites, there is no time limit for a listing, as long as there are trading activities on it. However, if an item has been inactive (which means there has been no order transaction or even no new bid/ask offers) for a period of time (for example, two months), the item will be removed from the listings (the user can re-list it again though). The new trading mechanism will also differ from the current stock/future exchange because what is being traded is real commodity merchandise and the trading service is 24 hr by 7 day (so there is neither market open nor market close). The users can place offers anytime. The server will use relative timing (to current) as its system timing. For example: the system will record timing like "This merchandise was last traded 36 minutes ago and a new bid offer for it was received 10 minutes ago". In this way, the server time can become a globalize time standard, and our international users at different location do not need to worry about calculate the time zone.

12) Benefit from the grouping technology, all grouped users will interact with their counterparties as a member from a certain user group. This will give our trading server the option and ability to hide the identity of each individual user, so to prevent/reduce their direct communications that bypasses our server, which will hurt income.

13) Compared with the ungrouped data/information, grouped info will result in a smaller page size at the server end. This can reduce both the server's load and network bandwidth requirement to communicate between the server and client terminals. This will further lead to at least three benefits: fasten the data transmission of current users, and bring new users from lower-speed connections (such as dial-up) from other application/protocols such as WAP (WML) and from devices with limited display ability (such as cell phone).

14) Due to the facts of using merchandise's group ID (MGID) and no limit of listing time, it saves lots of users' homework to input/read the description of the listed item. For example, if someone is going to sell some thing that already had been listed by others, he can simply refer to that group ID (such as by its UPC bar code) without the pain of re-entering all information regarding that item again. Same for buyer.

15) Since the shipping is chosen and performed by carriers independently, it would be difficult and costly for the sellers to cheating on price by bidding his own listing, or to cheat the feedback rating by selling item to themselves without really mailing it out.

16) Grouped users and information are often more attractive to their counterparties. The invention can generate "wholesale" transaction from "retail" transactions by organizing and combine individual asker/bidder/cAsker into corresponding user groups.

DRAWINGS

Total 28 figures (FIG. 1 to FIG. 25) on 28 pages.

BRIEF DESCRIPTION OF THE FIGURES

FIG. 15. pre-filtering of candidate offer list
FIG. 16. screen snapshot from the demo website pages "Defaultaspx"
FIG. 17. screen snapshot from the demo website pages "Asks.aspx"
FIG. 18. screen snapshot from the demo website pages "Bids.aspx"
FIG. 19. screen snapshot from the demo website pages "cAsks.aspx"
FIG. 20. screen snapshot from the demo website pages "product.aspx"
FIG. 21. screen snapshot from the demo website pages "add_new_product.aspx"
FIG. 22. screen snapshot from the demo website pages "GID_Encoder.aspx"
FIG. 23. screen snapshot from the demo website pages "offerMatcher.aspx"
FIG. 24. screen snapshot from the demo website pages "admin.aspx"
FIG. 25. screen snapshot from the demo website pages "packingMethodSelector.aspx"

DETAILED DESCRIPTION OF THE FIGURES

FIG. 1A. Illustration of the trading system's framework. Illustrate the function and component of the trading system embodiment. Top(1A01): System function: for a merchandise to arrive to the end consumer, there must be a seller and a shipping service carrier to connect them. Bottom panel (1A02). System structure: the platform server consists of database and database server, central application server and interface server (such as web server) with proper security protections. Each knot of the server can be one computer or a group of computers. Users (asker/bidder/carrier) can communicate with central server via internet or other network such as cable network, satellite network, telephone network, etc. User can use a variety of client interface terminals such as computer, phones, PDA or interactive TV. Detail of the four sub-database component is illustrated in FIG. 1B.

FIG. 1B. Illustration of database relationship. Show the sample of key component tables and mutual relationship of the merchandise database, user database, offer/order database and shipping package database. Each database consists of several tables that interact with each other and with other databases. Shiping_package_selector routine will be used to map a MGID to an appropriate packing method thus make a link between these two databases. "AM" means Acceptance Mask. Screenshot follows MS-Acess conventions, such as bold fields are primary keys.

Figure 2:
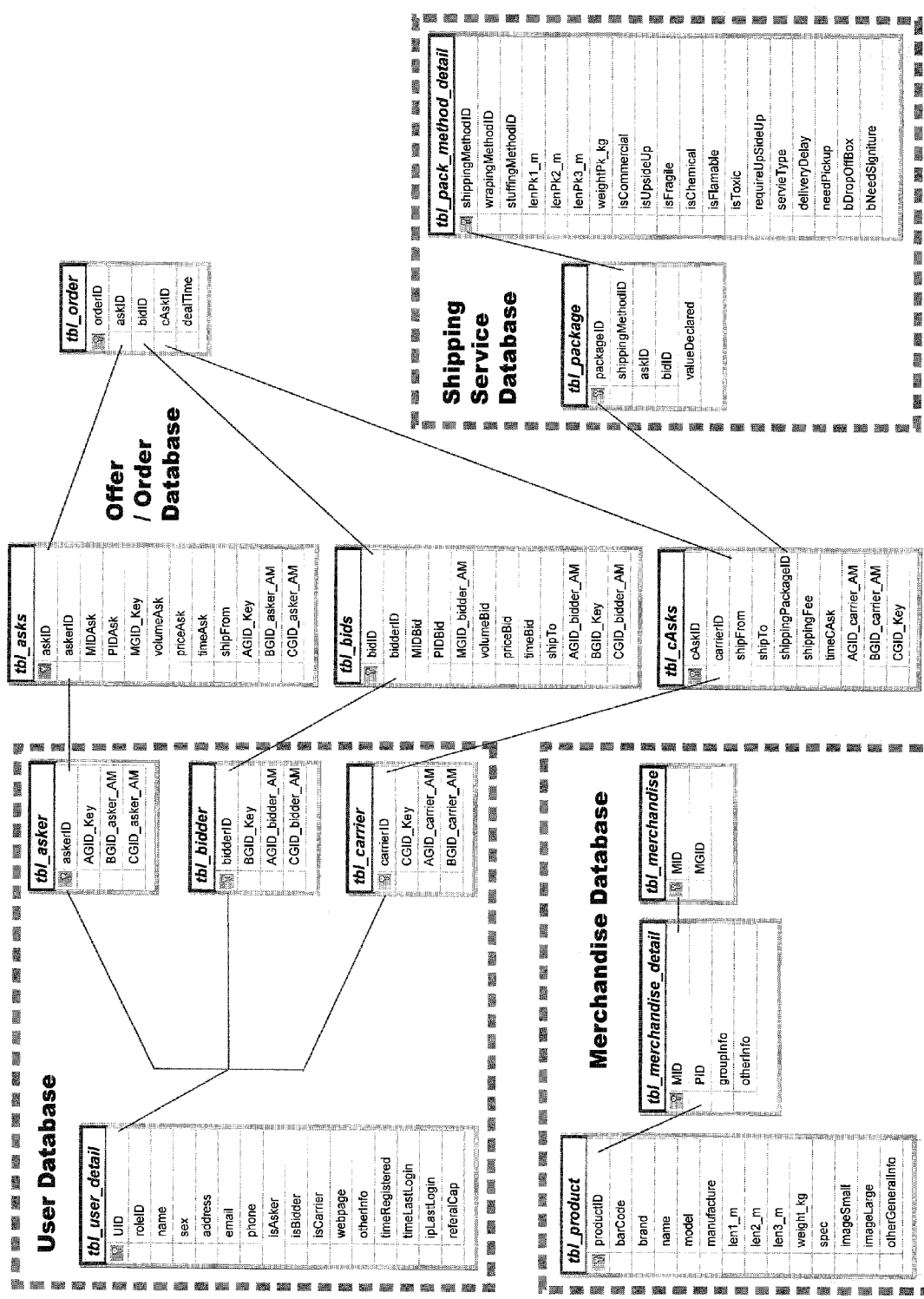
FIG. 2. sample of property page of merchandise categorization
FIG. 3. sample of property page of asker(seller) categorization
FIG. 4. sample of property page of bidder(buyer) categorization
FIG. 5. demo of two algorithms for encoder.

FIG. 2. Sample property page used for merchandise categorization. Merchandise properties are grouped into columns of option lists. There are simple property selection columns (with only one column) and complex selection columns (with more than one column, as framed in the grey background box). Those Applicable items of the property options list are checked.

FIG. 3. sample property page of asker(seller) categorization

FIG. 4. sample property page of bidder(buyer) categorization

Figure 5B:
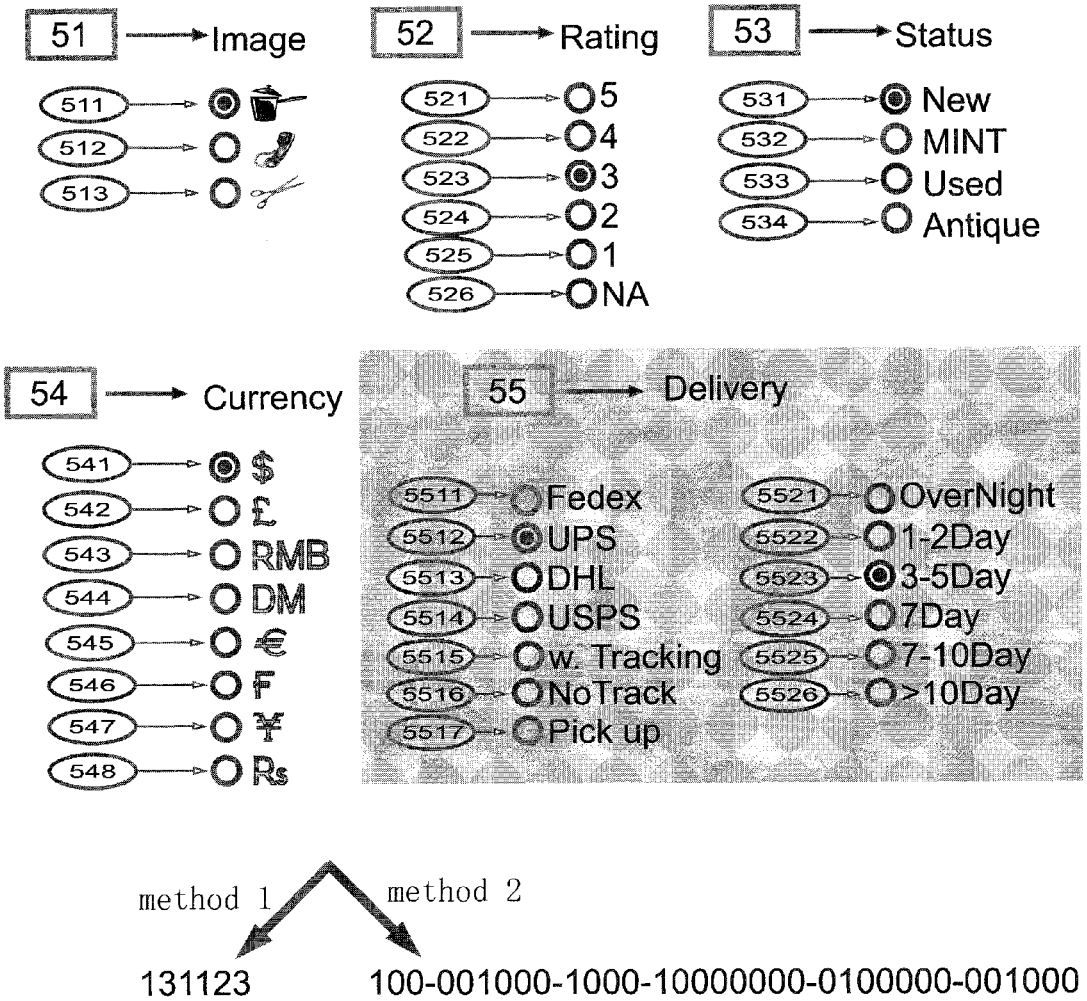

FIG. 5A. flowchart of procedure to encode property page into GID. Encoder routine is as illustrated in FIG. 5B. Auto-upgrade routine is shown in FIG. 6.

FIG. 5B. Demo of two algorithms for the encoder routine. Demonstrate encoding property page into GID with two types of encoder. Encoder 1 just lists the selected options within each column section. Encoder 2 will use 0 to stand for unchecked options and 1 for checked options. By list all checked and unchecked options, encoder 2 can handle more detailed information and would be especially useful when more than one option are applicable within a single section. GID generated by encoder 2 will allow later matching between key and acceptance mask. Encoder 1 is simpler, but can only handle single selection properties.

Figure 6:
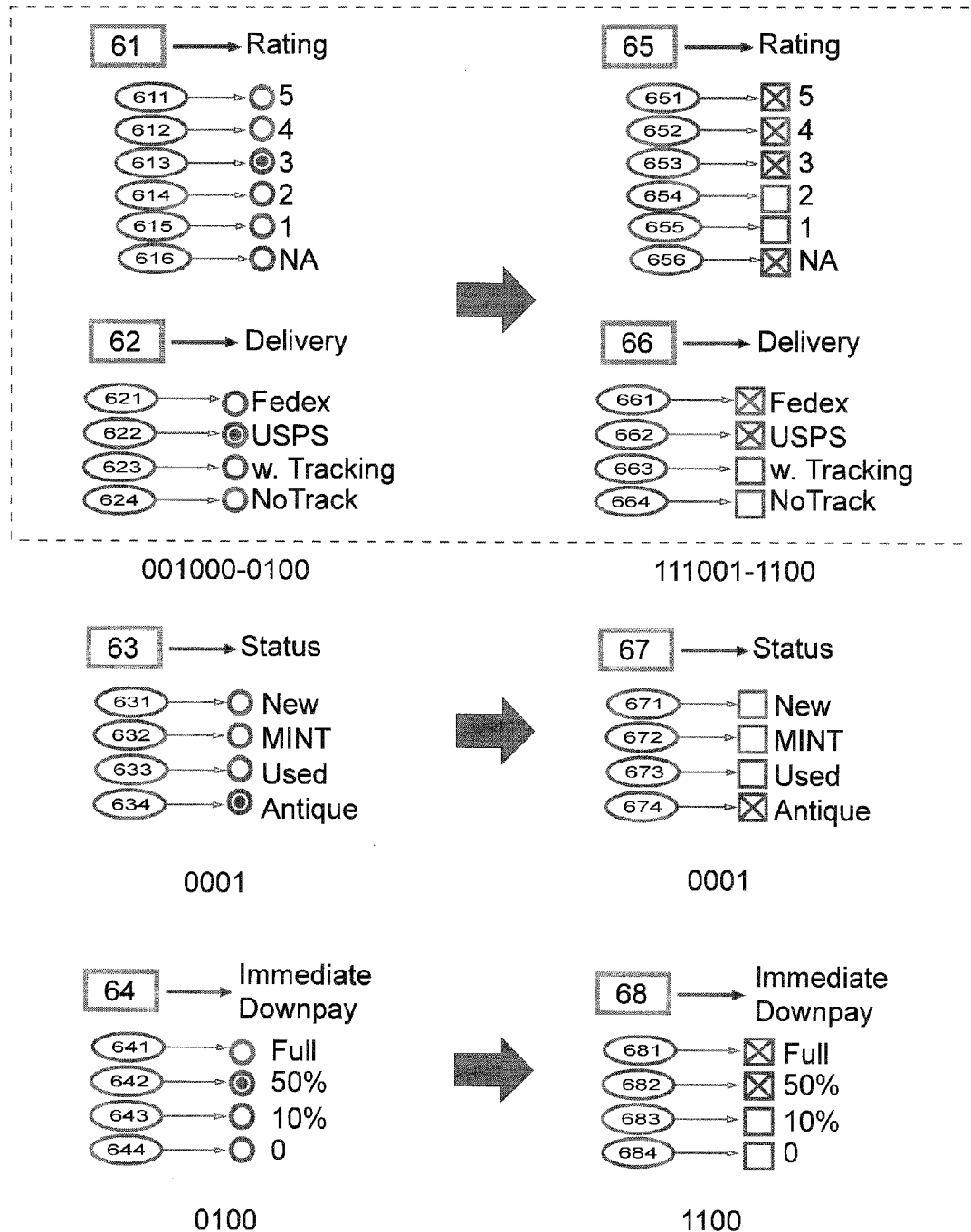
FIG. 6. GID's Exact Match vs. Auto Upgrade
FIG. 7. Matching between Key and Acceptance Mask
FIG. 8A. Total fees and final price
FIG. 8B. Fee_Caculation
FIG. 9. Grouping by GIDs
FIG. 10. Competing and peers
FIG. 11. Threshold
FIG. 12. Demo interface of buyer
FIG. 13. Demo interface of buyer, continued
FIG. 14. The way how shipping carrier involve themselves.

FIG. 6. GID's Exact Match vs. Auto Upgrade. When encoder generates GID from property pages, it can use either Exact Match or Auto Upgrade. Exact match is using the options directly. When encoding the property page of requirement, user can use Auto upgrade. It will automatically add other matched options before doing the encoding. For example, 61, 62, 63, 64 are four columns of property page. 61 is look for something with 3-star rating. By auto upgrade, both 4-star and 5-star are added. Item without any rating may also be added according to user's preference. 62 require a USPS delivery, and when using auto upgraded, FedEx is also acceptable. Same for 64 where seller requires a 50% deposit. By auto upgrade, full payment also be added to the acceptance list. Auto upgrade routine is smart, it will not add something inappropriate, such as since 63 is looking for something that is antique, it will keep that way. The upgraded property page is always subject to user's review, modification and confirm before being encoded into GID.

FIG. 7. Matching between Key and Acceptance Mask. Illustrate how Introducer matches user parties. Keys, the GID of provider, are those white boxes. Acceptance Masks, GID of receiver, are those gray boxes. Arrows show matched pair of Key and Acceptance mask. And a cross mark show failed match. Introducer routine uses Bitwise AND operation on each GID section. Only when result of all GID sections are non-zero, the records could be considered matched. Otherwise, any zero result of any GID section will fail the match. Top (701) is a matched pair because all three GID sections are matched. Middle (702) failed because the 2nd section (MGID) failed to match. Bottom (703) also failed because its 2nd section (MGID) fails to match.

Figure 8A:
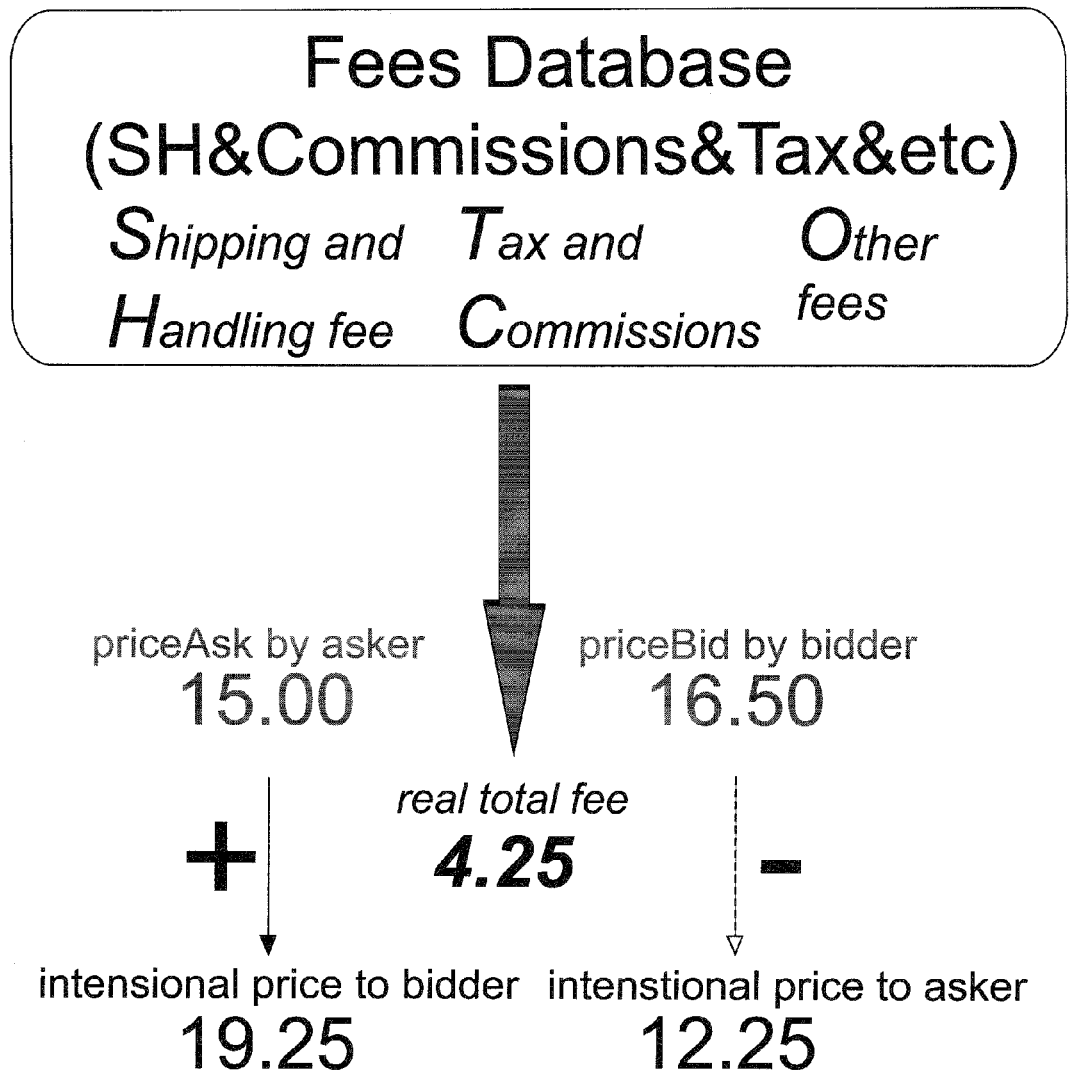

FIG. 8A. Total fees, final price and gap. Whether the deal can go through not only depend on the asker's priceAsk and bidder's priceBid, it also depends on extra fees such as shipping and handling fee, tax, etc, which make the real total fee. When an asker asks for a priceAsk, the bidder need to pay the priceAsk plus the above said real total fee. And the final bidding price for the asker should be the priceBid minus the real total fee. The equation for the gap is at the bottom of the page. SH: Shipping & Handling fee; TC: Tax & Commissions; O: Other fees.

FIG. 8B. fee_calculation routine which based on database tables. It could be a lookup table, a fixed rate or some routine. Its input would be the askID, bidID and merchandise's GID. Its output is the total fees such as shipping and handling fee. Etc.

Figure 9:
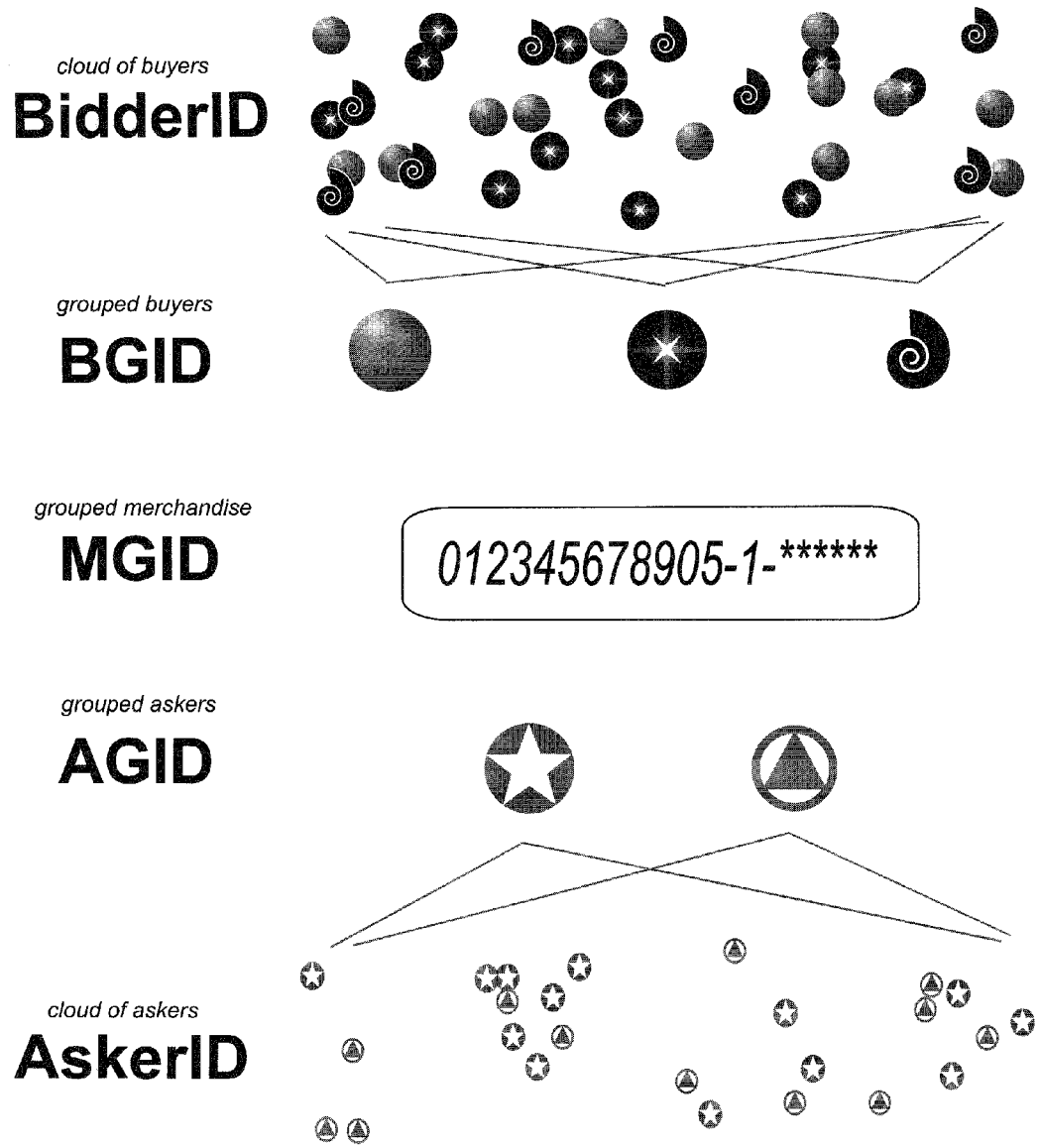

FIG. 9. Grouping merchandise and users by GIDs. It shows grouping of merchandise, bidders and askers. Clouds of askers/bidders/merchandise instances (identified by askerID/bidderID/MID) now have been grouped to asker/bidder/merchandise groups. So the interaction between individual seller, individual buyer and individual merchandise has been changed into interaction between grouped sellers, grouped buyers and grouped merchandise. Groups are represented by different symbols in the figure. For the MGID, the first two sections (012345678905-1) identify the merchandise by a bar code and image code. The rest part (****) is used to define further subgroups. In this sample case, all bidders are divided into 3 bidder groups, and all askers are divided into 2 asker groups. Pre-filtering by an introducer routine is performed at the group level before doing any deal matching at the instance level.

Figure 10:
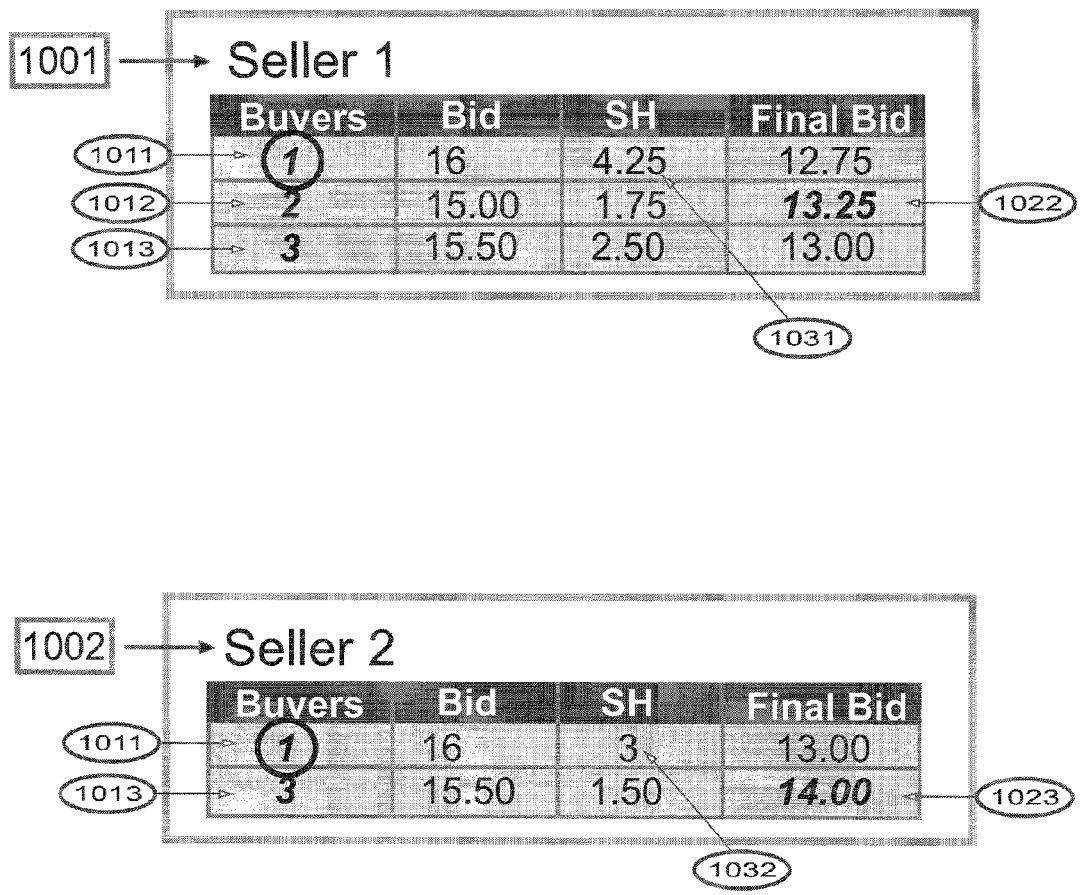

FIG. 10. Competing and peers. FIG. 10 shows how bidders compete with other peer bidders. Given the following scenario: There are three bidders (1011,1012,1013) on the market bidding for same item from two askers (1001,1002). Bidder 1011 offers $16.00 for it, and the offer would show at both askers. He has two peers (1012,1013) at asker 1001's list. At asker 1002, because the GID mask and key matching reason, only bidder 1013 is left to compete with 1011. Notice the SH are all different due to different asker/bidder locations and other properties. At asker 1001, bidder 1012 has the highest Final bid, which is 13.25 (1022). To bidder 1011, this means he has to place a bid of 13.25+4.25=$17.50 to over bid bidder 1012 from asker 1001. For the same reason, at asker 1002, the highest final bid would be 14+3=$17.00. So the highest bid on the whole market for Bidder 1011 would be equivalent to $17.5. Which is $1.50 above the bidder 1011's current $16.00 offer.

Figure 11:
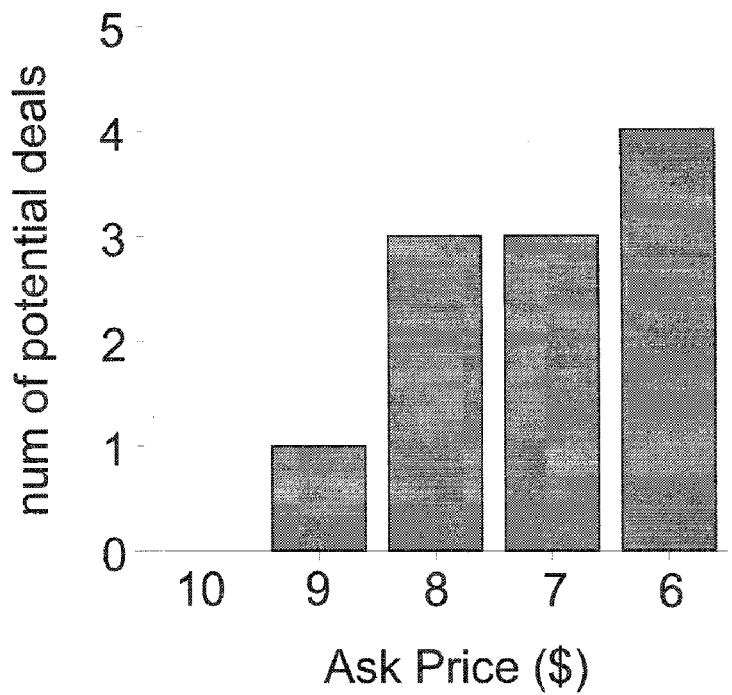

FIG. 11. Threshold. Illustrate how the number of potential deals depends on the price of ask. The lower the asker's priceAsk, the more the number of potential bidders can meet that price. By tools that provide such information, the asker will be able to make better decision of if he should decrease the priceAsk to increase volume, thus to increase the total dollars of sales.

Figure 12:
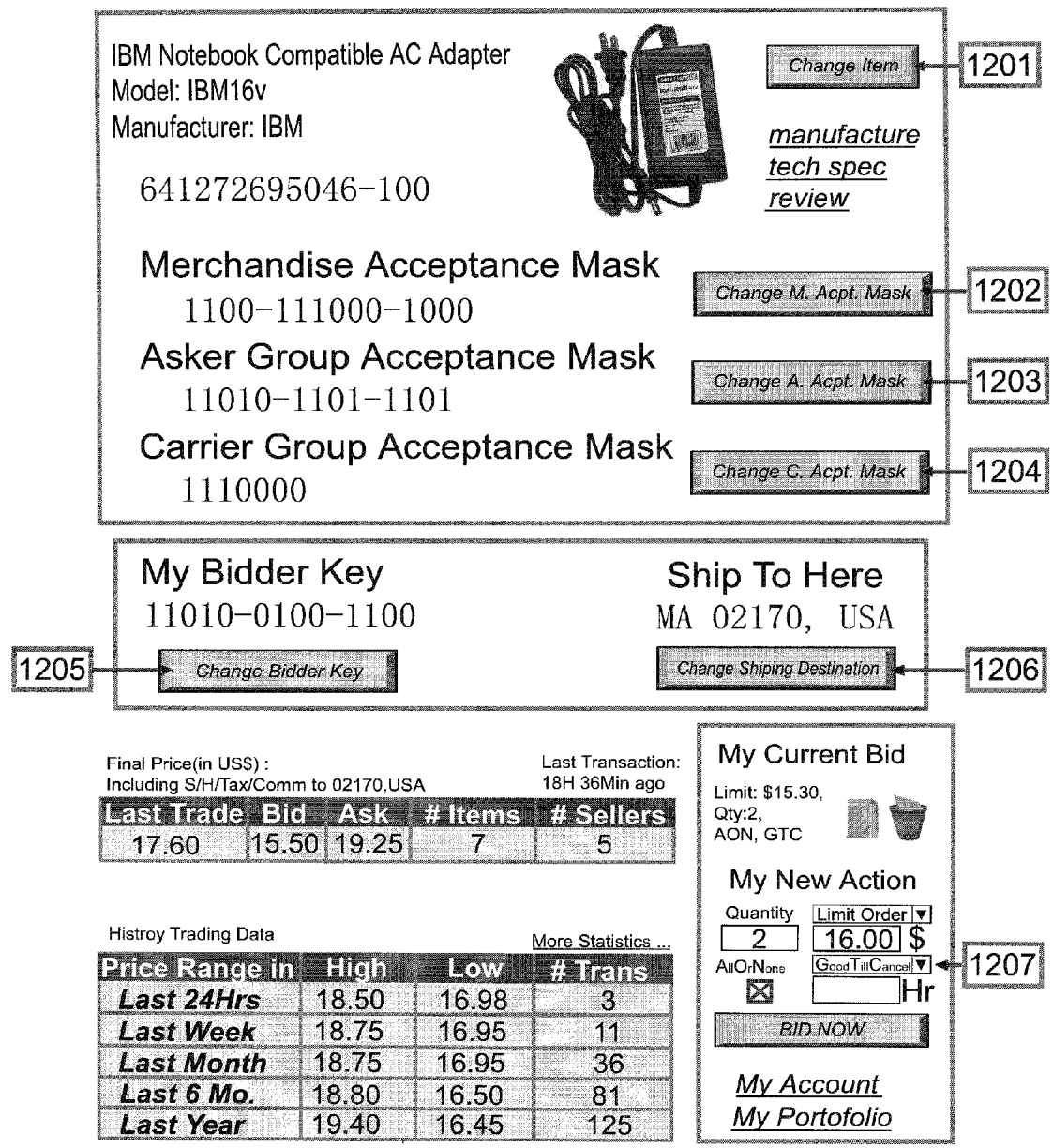

FIG. 12. Demo interface in front of a bidder (buyer). Show a demo interface the bidder may see from computer screen. The top box shows merchandise the bidder is looking for, the asker (seller)'s information and the shipping information. It also contains link to other information pages and buttons that allow bidder to modify the acceptance mask of the merchandise/asker/cAsker (1201,1202,1203,1204). The middle box will hold information from the bidder himself. Left side is the bidder's BGID, and right side is the shipping information needed for the shipping carriers to calculate the shipping cost and for tax calculation. There are buttons that allow bidder to change the BGID (1205) and shipping location (1206). The bottom area contains statistics number/table/chart for the item watched, and also the bidder's action and current auction status (position). This part also contains link and buttons that lead to other further pages.

FIG. 13. Demo interface of bidder, of FIG. 12 continued. This figure shows those pages where the bidder of FIG. 12 will see after the bidder click the buttons on FIG. 12. Box 1301 is the web page a bidder will see when he click button 1201 in FIG. 12. This box will let user to search and identify the item he wants by select a universal bar code and the merchandise's image (or image group). Box 1302 is the web page bidder will see when he click button 1202 in FIG. 12. This box will let user to modify the merchandise's acceptable condition/status that he is willing to buy. Box 1303 is the web page a bidder will see when he click button 1203 in FIG. 12. This box will let user to determine the sellers from whom he is willing to purchase from. Box 1304 is the web page a bidder will see when he click button 1204 in FIG. 12. This box will let user to set the requirement for the shipping/delivery service. Box 1305 is the web page bidder will see when he click button 1205 in FIG. 12. This box will let user to modify his own information of payment as a bidder. Please notice information on the left side (circled by doted line) is from system statistics result and can't be change by bidder. Bidder can modify the right side within the box for which method and how much deposit he would like to pay where radio button is provided thus let the bidder to make selections. After finished reviewing and modify the information in the above web page, the bidder can confirm and return to main interface web page shown in FIG. 12.

FIG. 14. Gap price formula showing two ways the shipping carriers (and other roles) can involve themselves in the merchandise trading. Shipping carriers can do their business on the platform in two ways. (1) the new way: They can create a new cAsk offer queue which offer the cost of shipping for all possible deal between each bidder and asker pair. This is illustrated at the top. (2) the old way: They don't need to put any cAsk offer. Instead, they can list their service and fee in a lookup table or even provided a flat rate. In this case, the shipping fee would be included as part of the total-fee returned by another fee_calculator routine. This is illustrated at the bottom. Database tables are from offer/order sub-database, which is illustrated in FIGS. 1A & 1B.

FIG. 15. Pre-filtering of large list of candidate offers by SQL command. This can reduce the queue size be removing unqualified offers before going forward to do deal match.

FIG. 16. screen snapshot from the demo website pages "Default.aspx"

FIG. 17. screen snapshot from the demo website pages "Asks.aspx"

Figure 18:
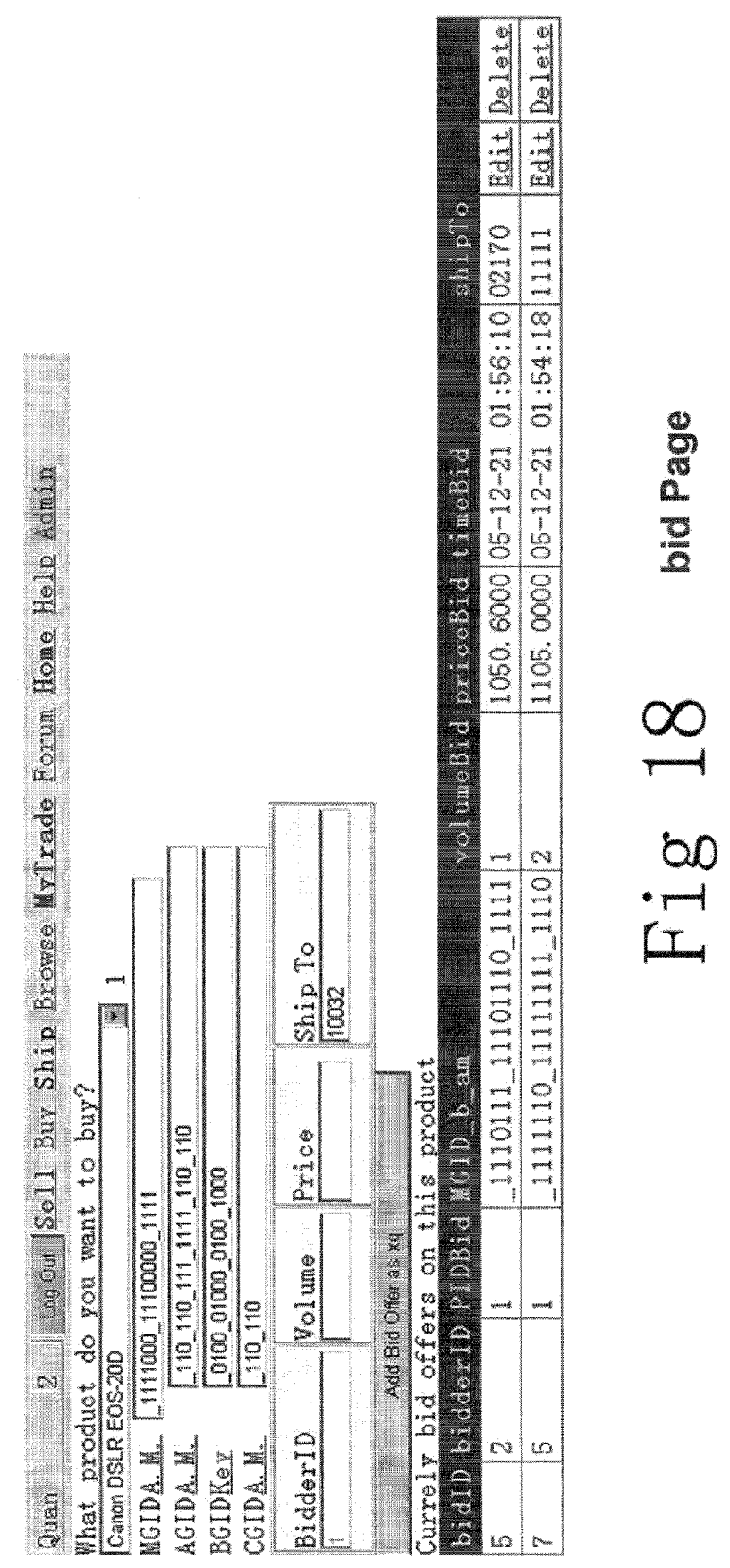

FIG. 18. screen snapshot from the demo website pages "Bids.aspx"

Figure 19:
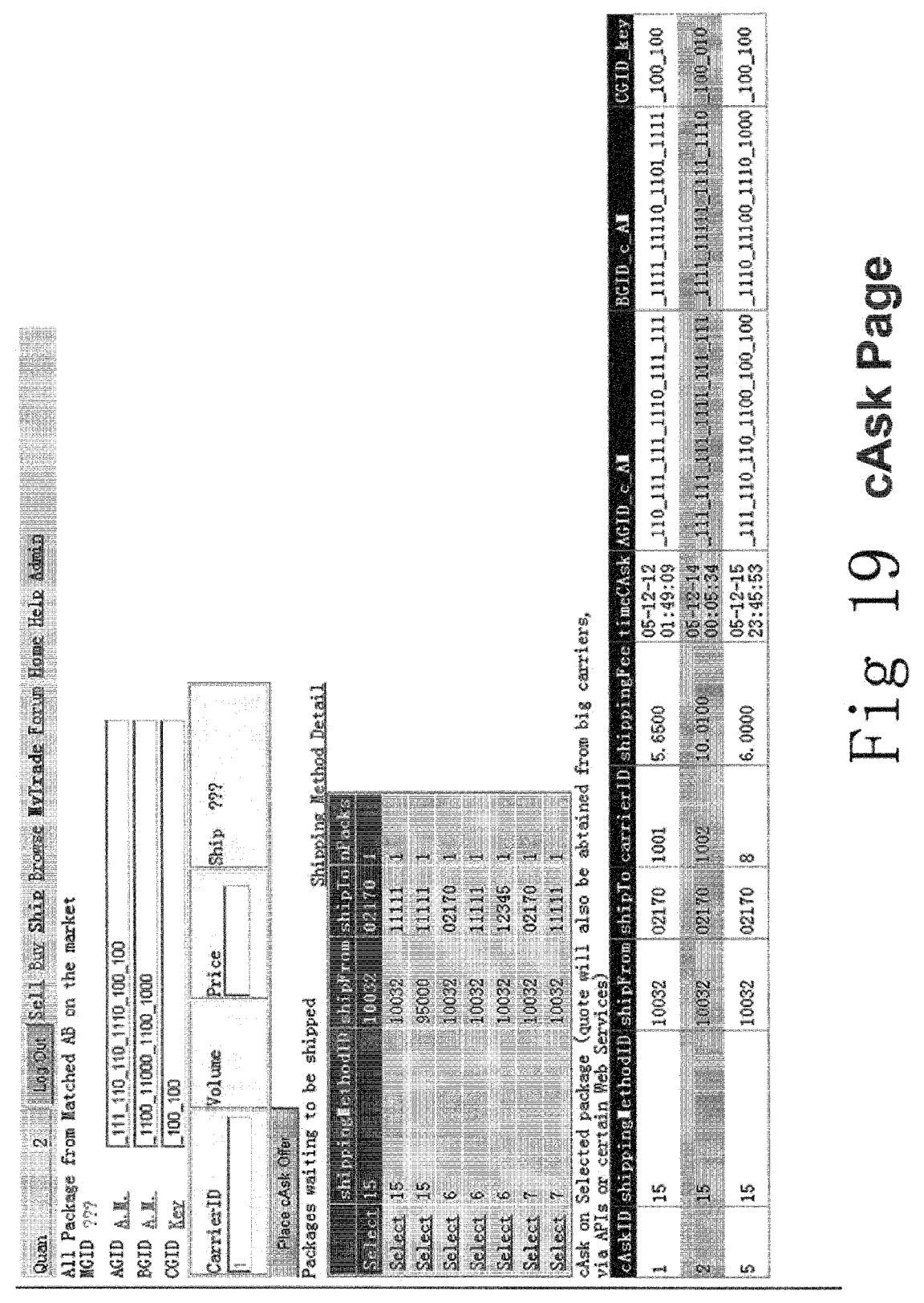

FIG. 19. screen snapshot from the demo website pages "cAsks.aspx"

FIG. 20. screen snapshot from the demo website pages "product.aspx"

FIG. 21. screen snapshot from the demo website pages "add_new_product.aspx"

FIG. 22. screen snapshot from the demo website pages "GID_Encoder.aspx"

FIG. 23. screen snapshot from the demo website pages "offerMatcher.aspx"

FIG. 24. screen snapshot from the demo website pages "admin.aspx"

FIG. 25. screen snapshot from the demo website pages "packingMethodSelector.aspx"

DETAILED DESCRIPTION OF INVENTION

Our invention will do the following things: group users and merchandise, identify each group by assigning a group ID (GID), matching GIDs to "pool" together counterparties who are interested to each other, calculate the real final price within each "pool", do the price match within previously matched groups. Now we will describe them below:

User Grouping and UGID

All users will be individually identified by a User ID (UID). UID are given to them when they register. The UID allows them to uniquely identify themselves, authenticate themselves and login in to the trading system server.

User roles of our platform would be the Asker (merchandise sellers), Bidder (merchandise buyer) and CAsker (or Carrier, refer to a package shipper agency). One user can have different roles such as being an asker, bidder, carrier or any combination of them. Then they are categorized into corresponding bidder/asker/carrier groups, and will be further assigned a User Group ID (UGID). These UGID will then be an Asker Group ID (AGID), Buyer Group ID (BGID) or Carrier Group ID (CGID) according to the user's role. The UGID is automatically assigned to a user, linked with his UID and maintained by the trading system when the user picks his role. It represents the grouping information for a user (as asker/bidder/carrier). The grouping information could be but not limited to permission/priority and counterparty feedback. This grouping information could reflect user membership levels, location (Zip code), payment methods and also based on statistics ratings of their previous transaction history, which including number of transaction, total sales, average unit prices per sale, etc. Property pages that define an AGID are different from that to define BGID. AGID page have fields related to sellers' warranty while BGID page has fields related to buyers' payment method. Demo of property page contains AGID and BGID components are illustrated in FIG. 3 and FIG. 4. CGID pages for cAsker (carrier) would be much simpler; it would be a list of properties of the shipping service it can provide, such as shipping methods, packing method, time of delivery, tracking availability, drop-off box, local service store info, etc.

Merchandise Grouping and MGID

Although each instance of merchandise is assigned with a Merchandise ID (MID) after been added into the trading system as individual, they are usually searched and matched by their category. When someone is searching for an item, it is not necessary to be that specific instance of item but rather the utility and properties provided by that item group (sub-group). For an example, one is looking for a 27 Apex Flat TV, one don't care about its serial number and who sell it, as long as the TV set he get can provide the functions and warranty he needs. For example, new TV sets with the same UPC bar code and carry same guarantee from manufactures and sellers. Thus, all TV sets instance that meet the user's requirement on the market from different sellers will be combined into one group of candidate TV group. All TV instance inside this group in eventually identical and they will compete against each other by other properties.

Merchandise will be grouped by Merchandise Grouping IDs (MGID). MGID is not simply a UPC bar code or ISBN. It describes NOT only what product the merchandise is, but also other extra information such as its image, status, consumer feedback (from our server or other 3rd party reviewer's site), warranty it carries, packing information, bulk information, delivery information, etc.

MGID is composed of several sections where each section contains variable length of detailed itemized properties.

The first section is the items universal (global) bar code and an image code used to identify the product. Bar codes could be an International Standard Serial Number (ISSN), International Article Number (EAC), UPC bar code or ISBN. Image code is a code refers to merchandise image or images group in case different items had the same SN in section one. (This should seldom likely to happen if their first section is from official global Series number. But sometime, for items that don't have any well accepted bar code, some customaries serial number (such as a store code plus the SKU number of the item in that store, or model number) could also be used by the website. Thus, we need the image code id to identify what product the merchandise is). User will choose the image or the group of images (show different specification of the same product) that best describe the product. This first section of the MGID (bar code plus image code) will be also referred to as Product ID (PID) in later part of this application.

The rest sections of MGID and option list within them will depend on the PID (MGID's first section, means bar code and image code). Different product would be described and categorized by different key features. After the item is identified by PID, the rest sections will describe, in an itemized way, its other key features that a bidder and asker ought to know. Such as for a wine, it will state where and when it is produced yet for a piece of furniture it would be its materials and dimensions. Basically, they would include the status, product ratings, packing information, delivery requirement, etc. Different item may have totally different list of properties fields to encode their MGID. A sample property page of MGID is illustrated in FIG. 2. Those columns related to delivery requirement may also be separated out from the MGID page as an independent carriers property page, which defines a CGID as Acceptance mask, which we will address in our later text.

In the above TV case, the PID (first section of MGID) will make sure the buyer get the type of TV he want, and the rest part of the MGID will be used to filtering and grouping all TV instance of the chosen PID on the whole market place. In brief, all merchandise with the SAME PID (same products) can be further divided into subgroups of the product by their MGID. MGID would identify all items with both same PID and same properties or status.

MGID can also be used to describe single piece of specific items instance when only one piece of instance can be categorized into that certain group. It happens for antique art collections. In this case, each asker (seller) already have been issued an unique askerID in our system, he can then issue a unique SKU ID number for that collection in his warehouse. The combination of the askerID and this SKU ID can be used as the MGID. When the bidder bid on this combined MGID, only one piece from the whole market can match all criteria since the askerID is unique, and the SKU ID is also unique for all items from that unique asker (seller).

Almost all services can also be traded as a regular merchandise by assigning the service with a MID and MGID. Services can be anything. They can be Internet ISP or CSP, cable/satellite TV program, room service, house keeping, repair, delivery, cell phone plan, travel package, vacation package, tour guide, designer, catering, dancer, convention receptions, ticket for movie/show/sports, advertisement, photograph or video service, music band, training courses, yoga program, insurance plan, consulting service (like law or financial), personal service such as hair, beauty, nutritionist, massage and bodyguard services, etc. As long as the service can be fully described by a list of itemized properties, the service provider can then register himself as an asker to sell the service to end consumers. One very special service among all these is the shipping (delivery) service provided by the shipping carriers. Almost every merchandise trading requires a shipping service to go through. The asker of the shipping service is called CAsker throughout this application.

GID Encoder

After the itemized property pages are defined, an encoder routine is used to encode those properties into GID (MGID and UGID) code. The GID will be used to category instance (user/merchandise) into groups and identify each group. There are lots of ways to encode the grouping information into a code. We will just list 2 of them as example.

FIG. 5 is a brief version of FIG. 2 (MGID) to show encoding of a MGID. Besides the SN, it has 4 simple selection columns (51, 52, 53 and 54) and one complex selection column (55). Each column has its lists of options. We can encode the item in FIG. 5 by either one of the follow two methods:

1) Combining the index of selected options in each column. Since the first option in column 5A is selected, the code would be 1. Since the 3rd option is selected in column 2, the code for 2nd column would be 3. In this case, because the 511, 523, 531, 541, 5512 and 5523 are selected, the grouping code would be 131123.

2) Listing all options within each column section, in a section by section order through the whole property page. In this case, the information is totally 3+6+4+8+7+6=34 bits in 6 sections. Assign value "I" for each selected option for each unselected option. You then get a series of "0"s and "1"s in 6 blocks. In this example, its binary code is 100-001000-1000-10000000-0100000-001000. (You can further convert these blocks of code regardless the sections info into other base for display purpose. Such as 211100808 in HEX, or 8876197896 in DEC, etc.) This above code would take 34 bit, or 6 bytes to save and will be used for bitwise operation in the later stages for finding matched groups.

Both encoding methods have their own usages, which we will refer to later in the following part of this application. Now we just follow the first encoding convention as an example: If the item's UPC code is 012345678905, then the MGID for the merchandise is 012345678905-1-31123. This MGID uniquely identify all merchandise with bar code as 012345678905 and image code as 1, and rest part of MGID as 31123 which means it have a 4 star rating, and in new conditions and price is in USD and will be delivered by UPS in 3-5 days. 012345678905-1 is also called PID as we said earlier. Thus all product with same PID can be divided into some smaller subgroups by the rest part of the MGID. Items within each subgroup are considered identical.

Similar method also applies to the encoding of user (asker/bidder/carrier)'s UGID (AGID/BGID/CGID).

Auto Upgrade of GID

The first encoding method seems simpler, but it is not powerful and convenient enough when there is more than one option applicable within a single column section. Let's consider the following situation: a bidder is searching for something without any bad user review. The example is illustrated in FIG. 6. In this case, bidder can auto upgrade the GOD's property page by add all options better than what the bidder would accepted in the option lists and then use the 2nd method for encoding. Figure's Top: The bidder is looking for an item with review-feedback better than 3 out of 5 (61), and would accept USPS for the shipment (62). The binary grouping code for this requirement is 001000-0100. What the Auto Upgrade routine does is to reject rating lower than 3 but adding rating 5, 4 and those with no rating (65); And in the delivery section, it will add FedEx to the option (66), since FedEx is assumed better than USPS. After the auto upgrade, radio buttons would be converted to check boxes, and property page will be refreshed for user to review, modify and confirm before going forward.

The 2nd encoding method would be perfect for this multiple selections situation. Now the new GID code would become 1110001-1100. The auto-upgrade routine is smart and making sense. It will not add "New" option to MGID if the thing being looked for is antique stuff, see FIG. 6 middle panel (63, 67). Same thing can also apply to upgrade and encoding a user GID, for example FIG. 6 bottom (64), a asker require the bidder pay 50% as deposit right after the deal match, of course that it should be welcome if the bidder will pay in full (68). For a scenario, a user is looking for a tickets for a show or travel or reserve an diner table, he choose his most preferred time to be 6 PM and set a time window of 2 hours, the auto-upgrade routine will put all tickets from 4 pm-8 pm on this users list.

Key, Acceptance Mask and Introducer Routine

Key is a GID where each of its sections contains only one selected options. Key is used to describe the precise properties that a merchandise or user can provide. Acceptance Mask is a GID that allows one or multiple options to be selected during one section. An Acceptance Mask is used to describe the range of properties the receiver can accept. Transaction provider/receiver can use the GID either as a Key or as an Acceptance Mask, respectively, to match each other. Receiver, the party that looks for something (merchandise, service or payment) from a transaction, can use the related GID as Acceptance Mask. But provider, the party who gives out the merchandise, service or payment, can only use the corresponding GID as Key. Acceptance Mask are used to find qualified candidate Keys in later stages of processing. In a transaction: for merchandise related properties, the bidder is receiver; for payment related thing, the asker is receiver; for shipment related thing, carrier is the provider of the shipping service and both asker and bidder are receivers. When a bidder is look for something, he will define a MGID mask and an AGID mask. These Acceptance Masks are used to find the merchandise he is interested and the askers (seller) he would like to get that merchandise from. He will also use his assigned BGID as Key to identify himself and to match the BGID mask the asker (seller) defined. As to the asker, he will use MGID and AGID as Keys to identify the merchandise and himself and to match bidder's Acceptance Masks. The asker also defines a BGID Acceptance Mask to filter bidder's BGID Keys. When carriers are involved, carriers would provide CGID Keys to identify their service, and both asker and bidder will define their own CGID Acceptance Masks to define their requirement for the shipping/carriers. In some cases, carriers may also define AGID mask or BGID mask to select/avoid certain asker/bidder. Carriers may also define MGID mask to define merchandise he would like to ship. Refer to fields of tables of user database in FIG. 1B.

One asker may want sell products only to certain groups of bidders. Bidders may also want to buy products from only limited asker group. All these needs can be satisfied with prescreening by comparing the Keys against Acceptance Masks (both are derived from GID). Asker find bidders, who would like to buy stuff from him, by using his AGID as Key to match the bidders' Acceptance Masks generated from bidders' required AGIDs. Asker also find bidders, who are interested in the merchandise he sells, by using the MGID as Key to match bidder's required Acceptance Masks of merchandise (MGIDs). Bidder also find askers, who would like to sell stuff to him, by using his BGID as Key to match askers Acceptance Masks generated from askers' required BGIDs. An example scenario is shown in FIG. 7. A 5-star-rated asker is trying to sell brand new merchandise to bidders rated at least 3-star. And a 4-star-rated bidder is looking for the same item of MINT condition from asker with over 4-star feedback. The top panel of FIG. 7 (701) shows how they can find each other by defining and matching the corresponding GID Acceptance Masks and Keys.

When an offer is placed, the system will load the Key and Acceptance Mask (AM), according to the user's role, from the user database as default value. For example, when a user sells something, the server will use the information in tbl_asker to define his property as a seller (AGID_key) and set the requirement for desired buyers (BGID_asker_AM) and shipping service providers (CGID_asker_AM). The user can modify the default values for that specific offer so he can customaries his warranty and counterparty's restriction for each offer. Refer to FIG. 1B.

Introducer is the server routine used to do prescreening to find matched GIDs using Bitwise AND operation (such as '&' in C++). It compares Keys against Acceptance Masks bit by bit and then section by section. Within each single section, if the Bitwise AND result is non-zero, that section is matched. Only when the Bitwise AND results are non-zero for all of those sections (in this case their product would be non-zero), the overall result is considered a match, otherwise it failed. Since only one bit within each GID Key section could be "1" (the bit that represent the exact certain property), introducer (prescreener) can also just check that bit of section of the Acceptance Mask.

In FIG. 7, the top (701) has three sections: AGID, MGID and BGID. The bitwise AND results of these sections are 100000, 1000 and 010000, all of which are non-zero. So it is matched. The middle panel of FIG. 7 (702) is fail to match since the item for sale is used so the bitwise and for that section (MGID) is 0000. The User could decide if they like to use Exact Match or Auto Upgrade. The bottom (703) failed to match because the bidder does not use Auto Upgrade option for merchandise's MGID. Some restriction may apply while matching the mask and keys, such as if a "local pick up" option is chosen, the bidder and asker preferred have the adjacent locations judged by their zip code. Other wise it will not consider a match and give a warning notify to the users and require them to modify the options on the property pages.

By matching with GIDs, all users can be grouped and revealed to their counter parity by the GID of that user group. This could help to keep users anonymous from their counter parties. This approach will also help to protect server's income from commission.

Bidding, Asking and Lazy Traders

Offers of ask/bid on merchandise are submitted by askers/bidders independently, offer of asking shipping fees are submitted by, or quoted from, shipping carriers. These offers are received by server and save in database as tbl_asks, tbl_bids and tbl_cAsks. The offer from asker and bidder will contain MID, price and trading volume (quantity). The offer from carrier will contain package information which defined by the shipping requirement of the merchandise and quantity, locations of loading (pickup) and delivery (destination), and an asking prices, or quote, of shipping fee from different carriers. Major carriers in US do not do price match with their competitors, nor do they change their freight rates frequently (usually on a monthly basis by change of fuel surcharge). They are also required to provide same rate to all its customers to limit their liability down. This slow change and the "flat rate across customers" rules enable us to buffer their quote for each type of potential packages into a shipping fee database table. We can then provide a real-time-like quoting by query from our own buffered shipping database, provided that we use some routines to update the quotes in that database table from carriers at a regular basis (for example, every 15 minutes). This buffering approach will greatly speed up the shipping fee quoting and reduce the load and network traffic at the carriers' API server sides.

Bidder can choose a certain percentage of the offer, or a fixed amount of money, to be paid as down payment right after the deal is reached to secure the deal. To use this feature, the user is suggested to setup an account at our server. He must have sufficient pre-located fund or have valid credit card limit (pass credit check) linked to that account in order to cover the down payment of his current offers. Amount of this immediate down payment offer is also encode in the bidder's GID thus may increase his chance of wining the bid by giving him higher priority in the queue of offers. For a seller, he might want to require such feature to reduce the risk of meeting non-payment user.

Offers from asker/bidder can have other options like "all or none" if the quantity is greater than one. User can set his offering price by putting a "limit order", "stop order" or "market order" at the server. The server will in charge of convert them into real offer at market time when the market price meets the user's preset requirement. This part of process could be done by modifying those arts performed in the stock trading industry. For example, a "market order" would take, for a bidder, the lowest asking price and, for an asker, the highest bidding price. Order with order volume greater than one will be converted into sub-orders with smaller volume unless "All-Or-None" option is required. Shipping packages could also allow "combined shipping" to lower the total cost.

The new system is so easy to use thus it will enable a trader to be as lazy as he wants. One can use the "market order" which will guarantee him to get the best of all current possible deals without doing extensive research or prices comparison. Another feature he can use is a "Relative Price". This is a scoring sub-system like calculating the GRE score. He doesn't want to use market order but instead uses a percentage relative price which based on all offered current prices and/or historical price of that merchandise from his peers. For example, there are 100 bidders out there on the market who bid on the same subgroups of products, and you may use "90%" price by which the system will calculate an offer price which will probably put you near the position of the top 10% highest bidder from all your peers (for example, by priceMin+(priceMax−priceMin)*0.9) or the mean value of the 10th price and the 11th price, which will make you the new 11th highest bidder). You can also obtain a relative price by referring to the trading history, for example, the past one month's, highest and lowest deal price.

Candidate List

There will be full lists of all bids, asks and cAsks (asks from carriers). Each record in the list will be identified by unique bidIDs, askIDs or cAskIDs and saved into the database tables (tbl_asks, tbl_bids, tbl_cAsks in FIG. 1B). Introducer will find out those bidIDs/askIDs/cAskIDs with compatible (matched) Acceptance Masks and Keys. Those without any matched counter party will NOT be selected for further processing unless new offer is received and a match is found. As mentioned above, the price information is not considered by the introducer routine function in this prescreening, which only deals with matching GIDs representing properties of involved parties'. The introducer routine then divided these offers (identified by bidIDs/askIDs/cAskIDs) by the compare the merchandise's PID (the first section of MGID) into smaller subsets, where only one PID is involved within each subset offer records. Bid/ask information from multiple bidderIDs/askerIDs, together with the cAsk information from multiple shipping carriers for the same PID are accepted and make a candidates list for that PID, regardless of the 2nd section of MGID and the offers' price. Generally, bidders will use the MGID_bidder_AM as a mask to find matched merchandise (MGID_key from asker) on market (FIG. 1B). MIDBid is only useful when the bidder is bidding on a specific item, such as collection auctions, instead of trying to find a category of matched items with same functions and properties. In the latter case, the new system is well compatible with the prior arts, which is how the current auction web sites doing their business.

The SQL command to find candidate list of each PID would be something like:

```
SELECT askID, bidID, cAskID, timeAsk, timeBid, timeCAsk INTO
table_candidate_offers_of_PID
FROM tbl_asks AS a, tbl_bids AS b, tbl_cAsks AS c
WHERE is_matched( a.askerID, b.bidderID, c.carrierID )=1
AND ( get_product_id(b.midBid)=PID AND
get_product_id(a.midAsk) =PID AND
c.shippingMethodID=get_shipping_method(a.midAsk, b.voluneBid) )
```

The returned (output) values of the above step are the askID, bidID and cAskID, which are combinations of IDs of candidate list of ask offers, bid offers and shipping offers, together with the time those offers are made. As the descriptive SQL command has illustrated above, the aim of this step is to find out from the whole records set of ask/bid/cAsk those records where: 1) the item the bidders bids is same as what the asker asks, and the shipper could provide a suitable package to pack and ship it; and 2) the asker/bidder/cAsker are compatible (acceptable) to each other.

Suppose there are m askers, n bidders and k shipping carriers (notice that fields of the tbl_cAsks not only contains carrierID, but also contains packageID from tbl_package, which in turn depends on the askerID and bidderID, see FIG. 1B). In fact, each single combination of askID and bidID, there will be k possible shipping fees. The dataset will be m*n possible permutation of askIDs and bidIDs, then each row of askID and bidID is combined with k different carriers, and get quotes of shipping from each of the carriers. Before matching, the record set would be in its maximum size of m*n*k rows, each of which represents a permutation of ask, hid and cAsk offer, in reality the real dataset should always be of a smaller size because some unmatched data are filtered out.

There are three subroutines involved in the above SQL commands. They are "get_product_id", "get_shipping_method" and "is_matched". The get_product_id routine is used to get the PID (product id, the first section of the MGID) by doing a simple query against thl_merchandise_detail table. The get_shipping_method routine is an application or database table that returns the desired and required packing method for a specific merchandise and quantity. For an example: if the merchandise is a book, the returned packing method might be an envelope; if the merchandise is a TV, the packing method would be a carton box of proper size and with proper stuffing. The information will help shipment carriers to decide the shipping fee. Please notice the merchandise is the one that asker sells but the volume is the one the bidder buys, and the address of asker and bidder could be, but is not necessary, included at this step. The is_matched routine is a prescreening application using the above said Introducer routine to see if all sections between all involved parties have matched keys and acceptance masks.

There are at least two major advantages to prescreening all records into candidate lists subsets by their PIDs. First, it limits the records set to same PID thus reduces the combination of ask orders and bid order to a manageable size. Second, this will allow server groups (multiple server computers) to share the tasks of handling the whole records set by process one or more subsets on a single server.

Convert Candidate listing to Final listing queue

After subset records of candidate list for a PID are generated through the prescreening, the rest parts of MGID (since the PIDs are always the same within each subset) and qualified AGIDs/BGIDs/CGIDs are also obtained through the relational database tables. See FIG. 9. By fingerprinting and grouping within all AGID/BGID/CGID, huge amounts of askers/bidders/carriers are combined into limited numbers of groups. These groups can provide better communication and evaluation channels between multiple askers/bidders on multiple items.

Prices and fees such as Shipping/Handling/Tax must also be taken into consideration before doing the final deal matching. Askers from different locations sell items to bidders at different locations. This difference will generate a whole variety combination of shipping fees and taxes. Similar reason for the handling fees between multiple bidders and multiple askers. Sometime other fees like commission may also involved. These fees could be calculated by some fee_calculator subroutines under a formula or get from a database lookup table of fees. Refer to FIGS. 8A and 8B.

After presorting the candidate list by MGID/BGID/AGID/CGID matching, the complexity of this combination would be reduced a lot to a manageable size. Further more, these candidate list can be further pre-filtered before grouping with considering the SH fees, by simple SQL command, as illustrated in FIG. 15. Unlike trading stocks, the gap in our system is not solely the difference between the prices of ask and bid. The "gap" formula here is (ask+FEE−bid). For each candidate list, the fee is not a constant but rather as a function of the askID, bidID and other related parties such as the shipping carrier. It could be either feed from a fee database table where information of asker/bidder/carrier would determine the total shipping and handling fee for each particular transaction; or be calculated by some equations defined by shipping carriers and policy makers. As demoed in FIG. 8A, the S/H fee may also extend to tax and commission. These fees may or may not be charged to the askers, bidder or both. Like another format of handling fee, if there was any commission fee or other extra fees, it could always be automatically calculated and includes itself in the total fees. The prices that bidders/askers see are always the final cost or profit.

The demo SQL command for catc total price with S/H fee considered would be something like:

```
SELECT askID, bidID, cAskID, (priceAsk + shippingFee(askID, bidID,
carrrierID) + otherFee − priceBid) AS
    gapPrice, timeAsk, timeBid, timeCAsk
FROM table_candidate_offers_of_PID
WHERE gapPrice <=0
ORDER BY gap, priceBid DESC, other_order_param
```

The returned queue would be all records that could reach a possible deal (where the asker, bidder and carrier's gap price is less equal to zero). These records would then be sorted by some parameters. Sorting will be discussed below. The returned askID, bidID and cAskID would make a final list of queue for further deal matching. Please be reminded that a final list would be generated for each combination of matched GIDs (mGID/AGID/bGID/cGID) within a certain PID.

When new bid/ask/cAsk offers on this merchandise are received, they are inserted to the record queue of the corresponding final list and be given an Offer ID (OID). When an offer in queue is changed by the submitter, the information associated with its OID is simultaneously locked, modified and updated with the latest price and time of offer. When one offer is cancelled, all records corresponding to that OID is removed from the queue.

The market server would run 24 hr/7 day. It will do maintains during off-peak of market hours.

Basically there would be no time limit of listing merchandise on our platform as long as there is transaction on it. Like PK board of stock market, if some merchandise keeps being inactive, which means receiving no new bid nor ask on it, after a certain time period, it may be removed from the system queue.

When other extra fees applies (such as commission fee, tax, etc), formula would still be similar.

Derivative Market of Shipping Service for Carriers

As mentioned above, shipping fee plays an important role in calculation the final cost thus affects the gap price. Since the shipping fee is generated dynamically form database but not a prefixed price tag, carriers are given a stage in the market as well. In reality, all packages generated from the merchandise market are waiting to be shipped. This builds another market of shipping service where the transportation of these packages becomes the "merchandise". For example, FedEx has got 1500 shipment orders at the flat cost of $6.00 within USA. Then FedEx can see if he could lower this rate to 5.75, he will get extra 500 orders than now. This is done by competing with other carriers such as UPS through our platform. Thus, every shipments carrier can also actively compete on the derivative market of shipping fee. This competition is in REAL TIME and no longer in a passive way. Major carriers in USA may not willingly to change the rates for some other concerns such as to limit their liability. Even in this case, they are still allowed to adjust the rate for fuel surcharge from time to time. And any price adjustment like this can bring new matched deals by changing the gap in a dynamic way. In another aspect, smaller carriers or local courier service providers can then be given the chances and playground to compete with major carriers. By offer competitive fee rates, these smaller carriers can grab some orders from the major carrier giants. By adjust their rates (cAsk) more frequently in an "asker-like" behavior, it gives them more flexibility. Our trading engine can monitor and track any change in their shipping rates in a real-time manner, and then in turn affect the deal matching on the merchandise market at once.

Derivative Direct Sale Channel for Manufactures

The most successful manufacture who use direct sale is DELL. With the help of our trading system's backbone, any manufacture can build its own direct sale channel very quick and easily. This market will also help the manufactures to plan their production well ahead of time. Manufacture can plan their production by category of the orders and by the differences in delivery time. They can even sell option like offers which executed at a later time.

Peers Bid and Peers Ask

Peers compete with each other. FIG. 10 shows how one bidder compete with other peer bidders. Given the following scenario: There are three bidders (1011, 1012, 1013) on the market bidding for one item from 2 askers (1001, 1002). Bidder 1 offers $16.00 for it and the offer would show at both askers. He has two peers at asker 1's list. At asker 2, because the GID mask and key matching reason, only the 3rd bidder competes with him. Notice the SH are all different due to different asker/bidder locations and other properties. At asker 1, bidder 2 has the highest Final bid, which is 13.25(1022). To bidder 1, this means he has to place a bid of 13.25+4.25=$17.50 to over bid bidder 2. Same at asker 2, the highest final bid would be 14+3=$17.00. So the highest bid on the whole market for Bidder 1 would be equivalent to $17.5. This is $1.50 more than what he current offers. Similar rules applies for the askers/carriers and their peers.

Gaps, Priority of Queue and Deal Matching

The trading system dynamically matches bid/ask/cAsk offers in a real time manner and pick out those offers whose gap price is either negative or zero. The queue of these offers within each said generated subset of records then needs to be sorted to according to priority to generate final orders. The sorting algorithm would be: smaller gap in price gets highest priority; earlier offer time gets higher priority, etc. The first criteria would be the gap price because a smaller gap price would infer either a higher bid price or a lower ask/cAsk price, which should be given privilege in the queue. When the gaps are same, we can give higher priceBid a higher priority because it is the total money being paid, which can produce more commissions for our service. Following could be the time when the offers are given. We can also customaries the priority in sorting, such as we can give user with higher rating a higher priority, associate with membership levels, etc. For example, a 4-star rated user and a 5-star rated user offer the same price at the same time. The system may decide to sell it to the 5-star user. User can even choose to overwrite the default sorting priority settings of his own offer buy use additional defined and customizable criteria for the matching algorithm such as they just prefer certain group of user even they do not offer the best price.

Gap is the difference between the need and supply. In our trading system, supplies is encoded into GID Keys while needs are encoded into GID Acceptance Masks. Thus, any difference in each segment of GID pairs of the Keys and the Acceptance Masks can be considered as a "gap" in GIDs. And these gaps in GID, which are pretty similar in function to the gapPrice, can also serve to be used as minor sorting criteria, which will provide cues (index) for sorting when the major criteria are all same. For example, the down payment percentage is encoded as one segment of GID, which can give serious bidder higher priority over others when other major "gaps" are same.

After the offers candidates are sorted, orders are generated from this sorted list of queue (one by one). Each order contains the askerID, bidderID, cAskerID, mID that the asker is selling and volume that the bidder is finally buying, which is usually the minimum value of the volumeAsk and volumeBid. The source code in Matlab ('gap_matcher_demo.m') and VB ('offerMatcher.aspx.vb') are attached to show how to find out matched deals from queue of candidate offers (with gap Price<=0) and to generate the final orders.

Advanced: Portal folio Deal Matching

This system is very versatile and flexible. User can make some portal folio bids and asks. They can set the priority and order for their portal folios to be executed. For example, a user wants to DIY a computer. He can put an offer of motherboard, CPU, power, case, memory, hard drive, etc. He make a portal folio offer contains 7 or more items. When he submit this portal folio offer, system regards the 7 sub-offers as a whole offer and will hold them till all of them are available on the market before putting the order into the waiting queue and return only 1 total price for the whole computer instead of 7 prices.

User may also want to buy a mouse and a mouse pad. But he wants to make sure to get a mouse first then the mouse pad. He can set the execute order of his bid offer, so the mouse pad offer will be hold until he got the mouse.

This is also true for the askers. He might only have one piece of item, but he can still managed to list it at different price to different buyer groups. And when any of those offers are matched, the rest is automatically voided at the same time.

Payment, Transaction and Execution Time

The system will consummate and track the sale on matched deals automatically. When a match is found, the system will make a contract of deal on the said merchandise between the selected asker, selected bidder and selected shipping carrier. Notification and tracking info will be sent to the bidder, asker and the carrier. Execution time will also be arranged and tracked by the server. Notice will also get documented in the trading system server for survey and rating.

When the bidder made his offer, he needs to fill out the method of payment. He can choose from standard methods such as Credit card, online wiring, e-check or other 3rd party payment service. The bidder need also agree to pay a certain percentage (0~100%) as down payment to secure the deal, that amount will be deducted from bidder's said pre-set account immediately after the deal is reached. The rest of the payment will be clear later between the bidder, asker and cAsker (shipper).

Transaction is considered as done only when 1) payer has paid full payment to the payees (asker and carrier) and 2) buyer got the item from the seller/carrier. Otherwise, it will keep pending and sending notice to the payer, seller or carrier.

Generally, merchandise's price will drop in the long run. User can bid for some thing that needs to be delivered after a certain period of delay rather than right away. Usually he can get a better price. For example, they can bid a computer with chosen configuration but be delivered within 6 month at a much lower price. He can also get a new camera as Xmas gift long before the Xmas. There are always individual users who are good at finding good deals so they could get stuff at lower price and sell it later at a higher price to others. These users can also do the same trick by selling first and taking the risk to find the deals later.

The "falling trend" makes the merchandise market like a "bear stock market" where "PUT" options is profitable. Users could then do something like stock options trading on regular merchandise market through our platform. Experienced users can bid for a "right", like a rain-check or coupon, to buy some merchandise in the future at a certain price at certain time from qualified "right issuers" (askers), who, usually the manufactures, could offer such a "right". By selling the options, manufactures can plan their productions ahead of time and generate some cash flow well in advance. For the options like contract, some pre-located security payment, at a certain percentage of the full payment, from the option asker (right issuers) is mandatory as sort of bidder protections (in the concept of deposit from askers).

Post-Transaction

After each transaction, bidders and askers/cAskers will receive/give feedbacks ratings from/to their counter parties in the transaction. They will as well receive feedback from the trading system server (hosting website) about their trading behavior. The behavior includes the timeliness of payment and delivery and satisfaction of the merchandise. The feedbacks on users will in turn being encoded into users' UGIDs. Feedback request would be hold for the options like contact until the execution time. Bidders' feedback on merchandise will also be requested and later being reflected on the merchandise' MGIDs.

For each kind of merchandise on the market, historical transactions will be documented and statistically analyzed to provide information of price range, trading volume etc. The information could be revealed in the format of curve or tables, and provided to bidders and askers for their future purchasing reference. It could also be provided for market research of business purpose.

System Statistic: Merchandise Information and Rating of Users

Statistics information is essential for successful grouping. It not only provides Merchandise/User information about the trading but also evaluates the Users' trading behaviors.

More information about the merchandise/service, which is being traded, would be provided than it does in the traditional stock market. This is due to the fact that a MGID would carry more information than a stock ticker. It will not just be limited to the last trade, high-low and the gap. One asker may wonder what the 2nd high bid offer could be, if he change/lower the price, will he make more deals thus yields a larger profits from a larger volume? By providing something show the number of potential matches as a function of asking price, this asker will be given a answer of these sort of questions which are important for the asker to make decision. A demo of how price would effect users' decision is shown a chart is in FIG. 11. User can understand the market better by statistic data we provided.

Feedback rating is another main source for UGID (User's Group ID) and MGID. Overall ratings on involved Users should be done. Different rating result will categorize the user and merchandise into different groups thus affect the their GIDs. Rating should not only base on the number of users transactions, like what eBay does, but also by total order value of their transactions. As listed in FIG. 3 and FIG. 4. The reason is obvious, people trade $1000 computers should be more trustable than people trade $5 keyboards even they all have the same 95% positive feedback on number of transactions. The computer guy will beat the other in the ranking of statistics on total value of sales. Just as Google uses the "double ranking" technology in their search engine to sort search results, similar algorithm could be applied here too, which means the rating is effected by the importance and reputation of the rater. If a user always leave good feedbacks, the bad feedback from him will be more serious than that from users who are very pick- and leaving other bad feedback all the time. Feedbacks from a user has 3000 transactions would have more weigh than those users who just have 10 transaction. Our feedback and rating system will calculate and balance all information to give more objective statistics about rating. Another issue in the rating system is the follow-ups. Feedback need following up, not just after the transaction or received your merchandise. My DELL computer's keyboard failed after only 3 months of arrival but I have no way to reflect this complain to other users. Our new trading platform would provide user the option to leave "follow-up" comments again for the merchandise, and the sellers' warranty and responsiveness.

Back-End: Hardware and Software, Database and Application

The service solution could be developed in a multi-tiered way. For example the data tier (contains the database access components for the application), application tier (business rules and algorithm), and interface tier (dealing with user interface). The data tier and application tier would make the back-end while the interface tier is the front-end.

Backend of the system would consist of database server, database, database application and central application server. It will also contain an interface server and all related protocols as well as firewalls, it is illustrated in FIG. 1A02. The platform server's back-end is independent of its front-end, and it would exchange data with front-end through the interface server. Interface server also serves to communicate the trading platform server with users and partners companies through a variety of client interface.

The computing power of the entire platform can be run in a more distributed or integrated manner. The whole platform can be run on computers running any type of OS, such as Windows, Unix, Linux. etc. The whole server system can be run on a single computer. Or, on the other hand, each part of it can be run on different computer(s). In the future, as the market grows larger and larger, offer queue of each PID (product) can be processing by a designated individual server. Offers are, according to the product' PID, dispatched to sub-level peripheral server(s) from the central server. The sub-level peripheral server(s) can process the offers and generate orders/contracts for that specific product. Offers then be managed by the sublevel server or the central server. Each of the sub-level servers can also be an independent service that might be run by different partner companies.

Figure 1:
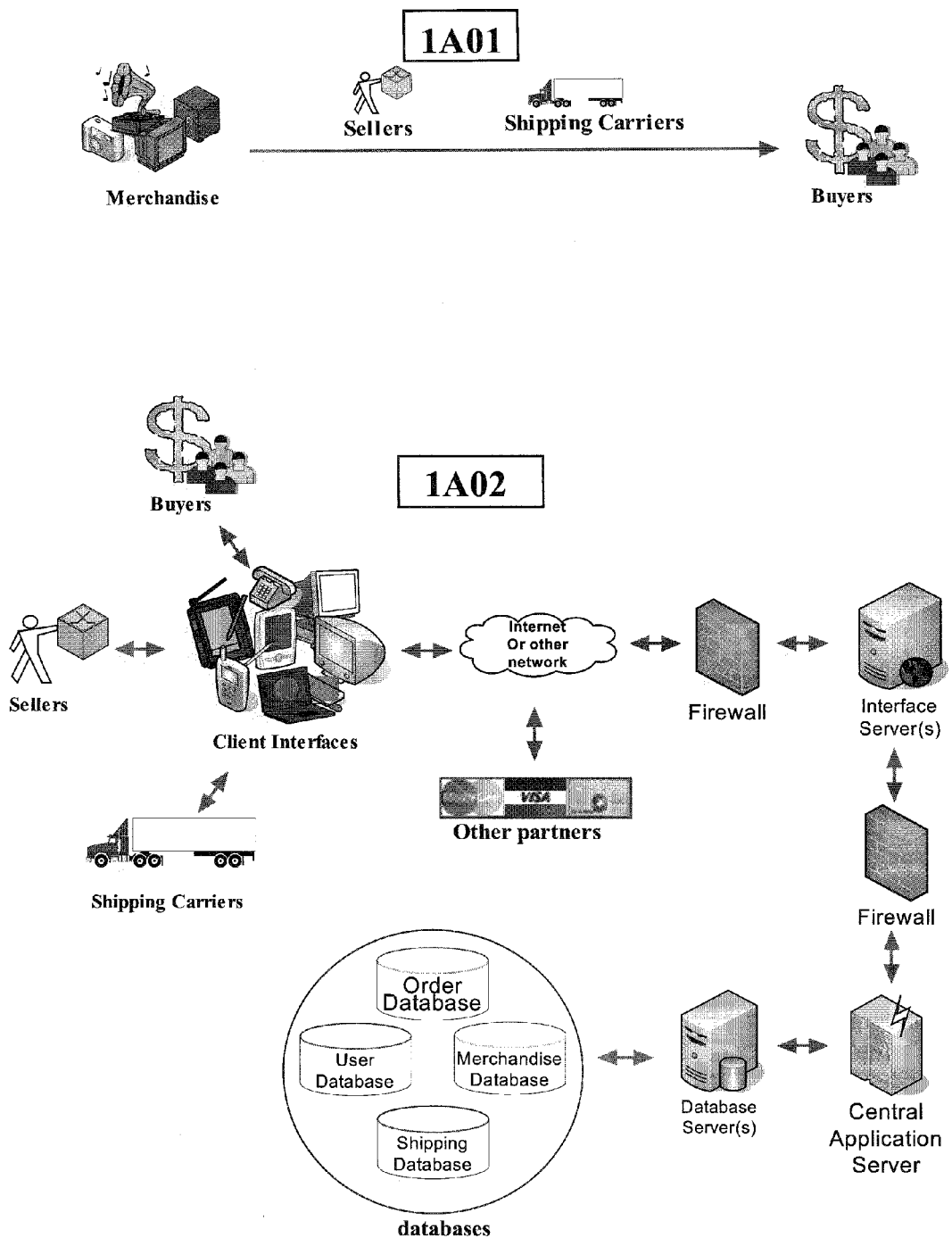
FIG. 1A. Trading system.
FIG. 1B. Illustration of database relationships.

The following description of server back-end will be based solely on illustration in FIG. 1A01 to keep the text simple.

Database: Where the information are stored and indexed. Information would be about merchandise, users (as bidder, asker or a shipping carrier), packages to be shipped, deal contracts, offers, orders and transactions. Offers from users include the original list and the final candidate list, which is generated by pre-filtering (FIG. 15) or an introducer routine. An illustration of database tables and the relationship is show in FIG. 1B.

Database application: procedures, functions and subroutines. Application handles and manipulates data in database. For example, the auto_upgrader, encoder, the deal_matcher, Shiping_package_selector, decoder and fee_calculator, etc.

Database server: coordinate database application and database

Interface server: coordinate communication between the backend and front-end interface. Such as web server, API server (to partner companies), ftp server, email server, call center, Web Service, etc. It will interpret among different interface terminals and exchange data between these components.

Central application server: the mainframe computer(s) of service system's backbone. Will handle overall applications, protocols and database; It will also do the all APIs such as payment, package tracking, rating and feedback, statistics, etc.

Protocols: rules and regulation for data storing, manipulating and exchange with internal and external interfaces. Protocols also include applications such as some API functions to communicate with internal or external human or application interface.

Front-End: Media and Interface

We are creating pages that are cross-device compatible rather than simply cross-browser and platform compatible. This trading platform can be utilized on any interactive media or telecommunication network. These media could be internet (computer network), TV cables, satellite, telephones (wire/wireless), network for wireless/mobile devices, and etc.

User can interact with the platform through any kind of media interfaces. It could be on a computer screen, TV, cell phone, PDA, game-box, telephone, or through a human or virtual User Representatives at call center or local branch offices. These interfaces will take users' input and give output back to them. Through interface server mentioned above, the front-end and backend can communicate and exchange data. Database of the back-end is independent of the front-end media, so user can communicate across different media network through the central server.

For example, an interface on computer screen would be something like the stock trading system, but much complex. In this case, the interface server would be a www server that provides both dynamic server pages (such as asp, jsp, cgi, etc) and html pages according to data obtained from its backend. A web browser application will display the last trading price, volume, historical data and etc. Other information such as number of bidder/asker, current bid/ask and gap can be shown. All prices (bid, ask, last trade, historical data, etc.) on this page are the real final prices which include all S/H fees and other commission fees. URLs lead to information related to the merchandise would also be there for the user to review. FIG. 12 show a demo interface of what a bidder would likely to see before a computer. When buttons on the page is clicked, the bidder will be directed to another page similar to corresponding section in FIG. 13, where user can modify the Acceptance Mask and the Keys. Notice that the user can't change the statistics and rating (left side of box 1305 in FIG. 13) which is provided by the trading system. He only have right to modify limited sections (right side) of his BGID Key. This bidder can also use FIG. 12 to change his order type (such as using market order, limit order or stop order, etc.), offer price, offer lifespan (restrictions such as whether his order is good till cancel or he only want put his offer for 36 hrs) and whether he use the all-or-none options (1207).

Interface displayed on a computer for an asker (seller) is different from that to the bidder (buyer), but the method to generate it is the same. Interface displayed before a shipping service carrier would be different too. It will contain features defining the shipping service provided, such as packing method, package size, weight, stuffing, service type, delivery time required, from and to address of the shipment and total number of packages and the price. The current market price for the shipping service could be shown as the difference between bidder's priceBid and the asker's priceAsk.

User interfaces on other networked media would provide similar information in a format that is supported by the corresponding terminals (hardware and protocols). For example it would use voice on a telephone call center interface. There is no limitation of what kind of terminal is and of where the interface locates. It could be both input device and output or it can be only part of input or output. It could be even on the merchandise itself. Any merchandise who has a display can display it value on the market by communication with our server via its own network. So don't be surprised when your little mp3 player/coffee maker will tell you its value on market that day when you turn it on. And you don't even have to log on our server in order to sell it. You can register the mp3's owner as yourself at our server when you purchased it. Then one day later when you see the bid and ask price of the mp3, you can enter your offered price with the mp3 buttons and submit it with mp3. The mp3 will transfer this offer together with its SN through its own network (maybe some wireless music exchanging network) into our server. According to the SN of this unit, server will find out the registered ownership information. Your UID and AGID will be used to put that mp3 player into the listing queue on the market. If a matched deal is reached, an email will send to you including all shipping information of the bidder on a paid printable pack slip with tracking number on it. And at the same time, the mp3 could also get a notice and then flashes "I am no longer yours tomorrow!" All you need to do is wrapping the mp3, printout the packing slip, and drop it at a carrier's drop-box. When the carrier pick-up the item and scan it, a notice (email) will be send to both you and the bidder automatically.

Isolated by an interface server and the related protocols, front end and backend are separated and independent. Change/modification occurred at either back-end or front-end will not affect another.

Communication With Other Third Party Web Services

Our platform will interact and communicate with other web services out there. Those web services may include user authentication (affiliating referring), shipping carriers' rates, credit card authorization and payment, shipping tracking, review and feedback, etc. All the resource out there on the net can be integrated under our universal trading framework.

Operation: How does the System Work

User registration: To trade through the system of this invention, users need to register themselves by choosing a userID and a password. They need to fill out some general information page and save the data into a database table (tbl_user). After that they need to assign themselves, at least one role, as an asker (merchandise seller), a bidder (buyer) or a carrier (shipping service provider). This assignment happens automatically when the user first make an offer of ask/bid/cAsk. One user can have more than one role. For each role he wants to linked to his userID, he need to provide essential information for that role. He needs to fill out corresponding property pages where key features of that role are listed. A groupID (UGID) is provided associated with that role. Each user will also fill out another property page, as the acceptance definition, to select his acceptable counterparties. For example, to register as a bidder, one needs to fill out a bidder property page to encode a BGID as key (BGID_key). He also needs to define from which asker he would like to buy product. He needs to generate an AGID as acceptance mask (AGID_bidder_AM). He will further define what kind of shipping he required by define a CGID acceptance mask (CGID_bidder_AM). Information from user and from our system are encoded in to GIDs (key and Acceptance Masks) and then saved in tbl_bidders. Key and acceptance masks would be used by introducer routine to pick out desired counterparties. Information of all askers, bidders and cAskers are saved into corresponding database tables (tbl_askers, tbl_bidders or tbl_cAskers). Fields of database table and of those property pages refers to FIG. 1B.

Result of property page of user info is encoded into UGID (User groupID) by an encoder routine. User ID, UGID and related information are saved in user database. More user roles may be added in the future's more advanced trading system such as broker, tax collector, etc.

Merchandise registration: Before merchandise could be traded, it has to be on the market. Merchandise need to be registered on our trading system by a registered user (either asker or bidder). An asker (seller) can register an item he wants to sell, and a bidder (buyer) can register an item he is looking for. A cAsker (shipping carrier) can register all service types, which are defined by packingMethod (dimension, weight, stuffing, etc.), zip codes of pickup/delivery and delivery time, it can provide. The user needs to fill out information about the item or service by filling out the property page of the merchandise or service, respectively. Merchandise information such as a bar code, digital image, description of status needs to be included. If the identical merchandise/service is already in our database, the user (asker/cAsker) can save his time by retrieving the saved information in our system. The result of the property page is then encoded into MGID by encoder routine. All information is then saved to merchandise database. Carriers' registration for their shipping service would generate a full permutation of all kinds of packages with different specification and various locations. Fields of database table and of those property pages refers to FIG. 1B.

Offering: Registered asker can put an ask offer on a registered merchandise. Bidder can put a bid offer too even without any asker selling that item. When there is a potential deal (asker and bidder are speaking about the same item), all registered cAskers are involved by asking their fees (cAsk) to deliver the merchandise from the askers to the bidders. Offers from asker and bidder would include their UID, MID (the instance, in some case, and for tracking), MGID (the group), price and volume of offer. Offers from cAsker would include the cAsker's UID, the service type (shippingMethod) for the merchandise involved, and the shipping fee between locations of the involved asker and bidder.

Grouping and matching: Merchandise/Service are inserted into the database as an individual instance. After that they are grouped, matched and traded by their GIDs as a member from one certain group. For each PID (product) on the market, an introducer (prescreen) routine will be used to match all offers, from the asker/bidder/cAsker with the same PID, and list all subset combination of these potential offers. It is done by comparing the keys and acceptance masks between the involved parties. For each PID, those subset of offers that passed the prescreening are then feed to a deal_matcher routine which return all matched deal (where gap is less than or equal to zero). The demo source code of the deal_matcher in Matlab ('gap_matcher_demo.m') and VB ('offerMatcher.aspx.vb') are attached on a CD.

Gap and Margin: Gap is defined as priceAsk+priceCAsk−priceBid. If the gap of price was less than zero, there would be a gap margin that can be shared at a certain ratio by all participated users or even by the trading system. For example, the asker asks for $10, the bidder bids for $16, the carrier want $3 for shipping service. The gap margin is 10+3−16=−$3. If the distribution ratio is 1:1:1, the three dollars can then be divided evenly to all 3 users. So the asker get 10+3/3=$11, the bidder pay 16−3/3=$15, and the carrier get 3+3/3=$4. The trading system can also share this margin as profit. For example, it can keep all of the $3 margin in which case the buyer, seller and carrier just pay/get what they have offered. The system can adjust the ratio between the involved parties to regulate and leverage the transaction.

Transaction and Post-transaction: After matched deals are found, system will consummate a transaction by binding the involved offers from the asker, bidder and cAsker into an order. System will then generate an order contract and follow up that contract. It will coordinate all involved parties with payment, shipping tracking and feedback rating. The rating and statistic will be done automatically and the result of feedback ranking will then modify the GID of the involved user and merchandise. Extensive and extended statistics may also be committed for other purposes.

Key Routines

Auto-upgrade: upgrade an Acceptance Mask by select options better than those the receiver required. It could be a based on a general look-up table or sub-routine for each property group. For example, when a bidder is looking for an asker with rating 3/5 starts as input, the routine will also return the entry of 5/5 and 4/5 because they are better than 3/5. Refer to FIG. 6.

Shipping_package_selector: Used by the askers/cAskers to decide what kind of package is need to deliver the merchandise identified by its MGID. It could be based on a general look-up table contains dimension and weight of the merchandise, or through some specific API routines at each shipping service provider (cAsker). For example, for shipping a notebook computer, the package would be a box with proper foaming stuff. While for a book, an envelope will do the job. If more than one merchandise will be shipped (MIN (volumeAsk, volumeBid)>1), the shippingMethod must fits the requirement of both the dimension and weight. Given the askID and bidID, the program can return shippingMethodID for the merchandise. shippingMethodID and zip codes of the transportation is then provided to carriers to get the cAsk offers. Refer to Shipping Service database in FIG. 1B.

GID Encoder/Decoder: convert lists of selected options into a GID code. The encoder can use at least two algorithm of encoding for either single-choice selection or multiple-choice selections. Refer to FIGS. 2, 3, 4 and 5B.

Introducer (preScreener): using Bitwise-AND operation for each section. Then check the Product of all sections. If the product in non-zero (which means Bitwise-And results are non-zero for all sections), it would be considered a match. Introducer routine select out those matched (compatible) GID Keys and Acceptance Masks. Refer to FIG. 7 and FIG. 9

Fee_calculator: Together with the Shiping_package_selector routine, it will calculate all applicable fees such as SH fee, commission, tax, etc. It may return the resulting final fee according to database or based on lookup table or flat rates. Refer to FIG. 8A and FIG. 8B. It may also take into consideration of all applicable discount fees, such as store credit, discounted rate or valid coupons, etc.

Deal Matcher: Sort offers by gap and other criteria, match sorted offers by price and volume and then it will return matched offers and generate order. See attached source code shown in gap_matcher_demo.m, deal_matcher.m and deal_matcher_abc.m on the attached application CD.

Demo Web Application of Trading Server

Included in this application CD, we also developed a demo web application that demonstrated some key features offered by our invention. You need to setup a MS-SQL server and WWW server to run this web application. The demo solution is developed with ASP.NET and VB.

We tried to follow the three-tiered application model. According to this model, this application should be divided into the following tiers:

Presentation Tier: Contains the user interface (web pages) for the application

Business Tier: Contains the business rules (logic) for the application

Data Tier: Contains the data access components for the application

But in order to keep it simple and because of its demo purpose, we skip the three-tiered model at some places.

SQL Server and WWW Server Setup

Restore a SQL database named PPA as instructed in AspDemo.readme.txt in the folder ASP\ on the attached CD. Make sure the user ASPNET or IIS_WPG are its users with full write permission.

After setting up your WWW server, add a virtual path directed to the location of ASP\PPA_WEB\, and then set Default.aspx as its default page. After compiling, you can then access the web site by visiting http://IP_address/virtual-_path-name/where you will need to login the service. After authentication, you can follow a navigation bar at the top of the web pages.

There are different types of user accounts. Such as Admins, Moderators, Users, Guest, Greeners, etc. For detail, refer to table tbl_user_roles in the database. Guest and Greeners (name for new registered user) can browse the web but can't put any offers. Admin can access a secret page called admin.aspx where some administrate functions are presented. To test the full function of the web site, you can use one of the built-in admin with user name 'xq' with password as '1'. Other built-in users are from u5 to u8, with their passwords from 5 to 8, respectively.

A live demo can also be accessed at http:/www.profpro.com/PPA_WEB.

SMTP Mail Server Setup

You need setup a SMTP mail server to use the email referral and notification functions Key SQL Database Functions and ASP Demo Pages Screenshots Defaultaspx: where all the offers made by the currently logged in user are listed. FIG. 16

Asks.aspx: Where you can put an ask offer and all ask offers are listed. FIG. 17

Bids.aspx: Where you can put a bid offer and all bid offers are listed. FIG. 18

CAsks.aspx: Where you can put a cAsk(shipping) offer and all cAsk offers are listed. FIG. 19

Product.aspx: Where you can browse and search for a product. FIG. 20

Add_new_product.aspx: Where you can add a new product FIG. 21

GID_Encoder.aspx: Where you encode the GID Keys/AMs for M/A/B/C. FIG. 22. The information is defined by tables tbl_grp_pages, tbl_grp_blocks and tbl_grp_items in the database.

OfferMatcher.aspx: Where an admin user can see all matched offers, and close the deals. In this demo site, you will have to press a command button to do the task, but in real service, the matching subroutine will be done on real time automatically. FIG. 23. This is a hidden page that you can access through the admin.aspx.

admin.aspx. The page can only be accessed by administrators. FIG. 24. Be default, it will list all the database component such as tables, views, SP and Functions.

PackingMethodSelector.aspx: Where a logged in user can select shipping method from what he is selling. It will also list his previous history of shipping method for the same item. FIG. 25 dbo.ismatched(Key, AM): the SQL database function used to find positions of all 1s in the Key and check for the same location in AM. Return true if it is also 1 in AM. Which means the Key and AM are matched pairs.

DESCRIPTION & OPERATION of ALTERNATIVE EMBODIMENT

Shipping carrier may keep doing their business in the old passive and non-competitive way or compete in the package shipping market on our new platform. When they choose the old way, they don't need to put any cAsk offer. Instead, they can list their services and fees in a lookup table on their web site and leave the rest to our trading server's backend routines. In this case, our system can automatically generate some cAsk offer based on the lookup table for that carrier. As illustrated in FIG. 14.

Since in someway, shipping service can be considered as merchandise itself. One may only looks for a shipping service without purchasing any other merchandise. In this case, a deal may go only between the bidder and the carrier without any asker or any merchandise involved. For example, FedEx and UPS can register all their service packages, such as envelopes and boxes of different dimensions and weight and between different locations. And a consumer may want to mail 15 pages of A4 paper and one floppy disk from Boston to New York City. The carriers can compete on providing this service. The winner will ship the package for the bidder. This can itself be an independent server platform without involving any traditional merchandise and traditional sellers.

Advertisement industry and network media. Advertisement can also be traded on our server or on a stand-alone trading platform server. Each advertisement can be defined by some properties such as which media (website, TV or newspaper) it will be published, what level of the pages it locates, its word count and picture size, its color, and its start time and end time on the media, its format, etc. By this way, the advertisement media and position can be traded and people can bid for that position. The winner will be given an permit to upload his advertisement to the media and media will put the uploaded advertisement on according to the schedule and format in the agreement.

Other participant may be interested to join a more competitive game. For example, someone may act as brokers and charge broker fee (some format of handle/commission). They can help other customers to buy or sell items on line so to save those peoples time and money. Government policy maker can also adjust their state tax for all sales or on certain items, so to promote business of their state. They can do this by creating another bid/ask/tax offers. Current system server can handle all such requirements: minor customization at the introducer routine and fee_calculation routine will accommodate such needs.

Wholesale/retail/brokers. Wholesaler or retailer can use their BGID to get bulk volume rate and bulk volume shipping rate from manufacture. They can distribute by selling them to individual end users who can even use local pick up to get the product. Since all payment already done online, the user will only need to bring their pickup order confirmation and grab the stuff they ordered. Some local store can even setup a Pickup Only Casher Lane to help fastening the check out.

If the offer queue is very big on certain product, some pre-filtering can be used to reduce the subset size of candidate offers before take the cAsk in. The pseudo SQL code is shown in FIG. 15.

User interface can be either web-based (only need browser, with/without plugins/scripts) or application-based (need download/install client software).

Other stand-alone sites/servers that can trade services: From ordering TV program or find travel packages or even make a home doctor visit appointment, user can always use our website. You can also find a service that helps you to print out some digital pictures at the cheapest price at some near by local stores.

Technique/Intellectual property/Research result/Commercial information/creative ideas can all be trade here. In fact, we can trade anything that has value and categorizable. Coupon/order collectors/brokers who collect coupon/orders can sell their collection of coupons/orders here at our site.

Other unique stuff like telephone number, IP address, domain Names, etc can also be trade here.

CONCLUSION, RAMIFICATIONS, AND SCOPE OF INVENTION

Accordingly, the reader will see that:
1) This invention developed a method of categorizing merchandise or parties in a commercial transaction (namely but not limited to seller, buyer, shipping carrier) by first grouping the merchandise or parties and then identifying each group of merchandise or party with an encoded unique group ID (GID). These GIDs can be used to describe the properties that the group can provide (the GID Key) or the properties that the group can accept (the GID Acceptance Mask, or GID AM).
   a) The criteria for grouping merchandise will include not only what the merchandise is (such as using a UPC bar code), but also full description of the status of the merchandise (such as new or used, the warty it carries), as well as user feedbacks on that merchandise (such as reviews rating from the users of the merchandise)
   b) The criteria for grouping parties of a transaction (seller/buyer/carrier) will include not only the membership info (time of registration, level) but also the payment method, feedback rating and previous transaction history. The feedback is from both the server (such as number of transaction, average time of response, total value and average value of transaction) and the other parties. For an asker or carrier, the store warranty policy can also be used for the categorization.
   c) Instances with same properties will be combined into a group and identified with the same Group ID (GID).
   d) The method of encoding the properties of merchandise and parties: First list all non-overlapping properties as a option list, then mark the applicable options with one token (such as 1) while the other inapplicable with a different token (such as 0)
   e) Asker (seller) of a transaction will provide AGID_Key to identify himself, MGID_key to identify the merchandise he is selling, a BGID_asker_AM to describe the bidders he (the asker) would deal with, and a CGID_asker_AM to describe the shipping service he (the asker) required.
   f) Bidder (buyer) of a transaction will provide BGID_Key to identify himself, MGID_bidder_AM to identify the merchandise he wants to buy, a AGID_bidder_AM to describe the asker he (the bidder) would deal with, and a CGID_bidder_AM to describe the shipping service he (the bidder) required.
   g) Carrier (shipper) of a transaction will provide CGID_Key to identify the shipping service he can provide, MGID_carrier_AM to describe the merchandise he can ship, a BGID_carrier_AM to describe the bidders he (the carrier) would deal with, and a AGID_carrier_AM to describe the askers he (the carrier) would deal with.
2) This invention developed a method of choosing candidates of possible transaction by matching the grouped merchandise and parties of transactions by comparing the providers' GID Keys against the counter parity's (receivers') Acceptance Masks (AM).
   a) The Keys and AM could be obtained by method mentioned above in method Id
   b) The match is between the Keys and AMs of all involved parties and merchandise. In a three parties (asker, bidder and carrier) transaction, there would be four sections in total: MGID, AGDI, BGID and CGID. They represent the groups of merchandise, asker, bidder and carrier, respectively.
   c) For each GID Key and AM section, the matching routine is performed for each item from the property list which is represented by the GID. When Key and AM are obtained from Method Id, this matching could be done with the BIT AND operation. A non-zero result indicates that the corresponding section is matched. Only when every single GID section of a transaction is matched, the involved parties and the merchandise could be considered the candidates of a possible transaction.
3) This invention developed a method of trading grouped merchandise or service by their GIDs, like trading stocks, among categorized user groups. It integrates the seller, buyer and also the shipping carriers into a real time universal dynamic trading platform.
   a) Merchandise or services are grouped and identified by unique MGID using method 1. Users (asker,bidder, cAsker) are also grouped and identified by unique UGIDs (AGDI,BGID,CGID) using the method mentioned above in Method 1.
   b) Candidates (merchandise and involved parties) of a possible transaction are selected out with method mentioned above in Method 2
   c) Within each merchandise/service group (MGID), the final total gap prices for the permutation of each possible transactions is calculated according to the formula below:

$$gap=priceAsk+shippingFee+otherFee-priceBid$$

d) A Negative final total gap price would indicate that the certain combination of parties, which is associated with that gap price, for that specific merchandise group (MGID) can reach a deal and thus conduct a transaction. Larger absolute values of the gap price would give higher priority in the execution order of the transaction queue. Priority of queue can be effected by other less important factors (such as time of the offer) when the gap prices are same.
   e) Feedback rating and previous behavior of user are encoded into the grouping information of that user, thus reflected on the GID of the user group. This would help to make reasonable expectation thus generate the satisfaction of the involved parties
   f) The users' payment method is encoded into the grouping information. This would help to reduce payment fault of online business transactions.
   g) By grouping users and merchandise/services, the trading system will provide more advanced and versatile tools for its user to trade common commodity and services. It allows user to make market order, limit order, make portfolio orders or even choose execution time of the orders. It also helps to relieve the load of server and network. The invention also enables other advanced features mentioned in the text of the application.

As used herein, it is understood that "program code" means any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as some or all of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

For the purposes of the claims, the term "merchandise", "grouped merchandise", "merchandise item" or other variations is intended to also mean "service", "grouped service", "service item" or other variations.

SEQUENCE LISTING

Not applicable.

What is claimed is:

1. A method in a system for grouped sellers to sell grouped merchandise to grouped buyers via a merchandise trading system, the method comprising the steps of:
   a) defining by at least one buyer a set of buyer characteristics to offer, defining a set of acceptable seller characteristics to require and a set of acceptable merchandise characteristics for a desired merchandise item;
   b) defining by at least one seller a set of seller characteristics to offer, defining a set of acceptable buyer characteristics to require and a set of merchandise characteristics for an offered merchandise item;
   c) defining by the merchandise trading system the buyer characteristics, the seller characteristics and the merchandise characteristics;
   d) grouping the buyers based upon the sets of buyer characteristics, the buyer characteristics may be encoded into a code which can later be used as identifier of the certain buyer group whose member buyers have the same sets of buyer characteristics;
   e) grouping the sellers based upon the sets of seller characteristics, the seller characteristics may be encoded into a code which can later be used as identifier of the certain seller group whose member sellers have the same sets of seller characteristics;
   f) grouping merchandise items based upon the sets of merchandise characteristics, the merchandise characteristics may be encoded into a code that can later be used as identifier of the certain merchandise group whose member merchandise have the same sets of merchandise characteristics;
   g) comparing the sets of merchandise characteristics of the seller's offered merchandise against the set of acceptable merchandise characteristics by the buyer so as to determine a merchandise match between buyer's desired merchandise item and seller's offered merchandise item;
   comparing the buyer's sets of offered buyer characteristics and the acceptable seller characteristics against the seller's acceptable buyer characteristics and the sets of offered seller characteristics, respectively, so as to determine a buyer/seller match between buyer and seller;
   i) if there is a merchandise match and, a buyer/seller match processing the sale transactions on the basis of a gap price, a deal match, or an order generation between the buyer and the seller; and
   j) trading from the seller to the buyer by shipping the merchandise to the buyer from the seller if there is a merchandise match and a buyer/seller match.

2. The method of claim 1 wherein the set of acceptable merchandise characteristics by the buyer includes a bid price, the set of merchandise characteristics by the seller includes an ask price, the method further comprising calculating by the merchandise trading system a gap price, subtracting the bid price from the ask price, and dividing the gap price between the buyer and the seller.

3. The method of claim 1 further comprising transporting by shipping carriers the merchandise from the seller to the buyer, defining by at least one carrier a set of carrier characteristics and defining by the merchandise trading system the carrier characteristics and comparing the set of acceptable merchandise characteristics by the buyer, the sets of merchandise characteristics by the seller and by the trading system and the sets of carrier characteristics so as to determine a match between the buyer's desired merchandise item, seller's offered merchandise item and the carrier's offered shipping services.

4. The method of claim 3 further comprising including in the set of acceptable merchandise characteristics by the buyer the buyer's shipping requirements, including in the set of merchandise characteristics by the seller the seller's shipping requirements, and including in the carrier characteristics the characteristics and price of the offered shipping service.

5. The method of claim 4 further including the step of adding the shipping price to the ask price and subtracting the bid price to result in the gap price, and the gap price may be further divided between the buyer, the seller, the carrier, and the trading system according to a distribution ratio among the buyer, seller and carrier.

6. The method of claim 5 further comprising shipping the merchandise to complete the transaction from the seller to the buyer, associating the transaction with a final fee, calculating the final fee by adding to the gap price all fees associated with the transaction including the shipping price, a commission price and a tax price, and subtracting from the gap price all discount fees associated with the transaction including, coupons and store credit, and dividing the final gap price according to a distribution ratio among the buyer, seller and carrier.

7. The method of claim 1 further comprising grouping buyers, grouping sellers, grouping merchandise, shipping by the carriers the merchandise and providing the carriers the characteristics of the grouped buyers, grouped sellers and grouped merchandise and holding an auction among the carriers to compete to provide the shipping services of the merchandise between the sellers and the buyers.

8. The method of claim 1 further comprising including the buyer's characteristics of how much money the buyer is willing to place as a down payment and including the seller's acceptable buyer characteristics of a down payment requirement by the seller.

9. The method of claim 1 further compromising providing buyer characteristics and seller characteristics, providing by the merchandise trading system the statistics of previous history of transaction behavior and feedback rating from counter parties, and including the merchandise characteristics ratings from users or other third party sources, and double-rating and weighting from the users and merchandise to determine the reputation and creditability of a rater.

10. The method of claim 1 further comprising choosing the buyer's acceptable merchandise characteristics or the seller's merchandise characteristics including a future execution time of the transaction.

11. The method of claim 1 wherein the seller is a service provider and buyer is a service receiver, wherein the merchandise is a service and comprises one of the following services: a shipping service, a communication service, a media service, a news service, an entertainment service, an advertisement, a healthcare service, or a brokerage service.

12. A merchandise trading system for allowing grouped sellers to sell grouped merchandise to grouped buyers via a merchandise trading system, the system comprising:
   a) at least one database server;
   b) a central application server;
   c) a user database for receiving and storing from at least one buyer a set of buyer characteristics, a set of acceptable seller characteristics and a set of acceptable merchandise characteristics for a desired merchandise item and for receiving and storing from at least one seller a set of seller characteristics, a set of acceptable buyer characteristics, and for receiving and storing from the database server further buyer characteristics and seller characteristics for the at least one buyer and at least one seller;
   d) a merchandise database for receiving and storing from the at least one seller a set of merchandise characteristics and receiving and storing from the trading system a set of merchandise characteristics;
   e) an offer/order database for receiving and storing from the at least one seller characteristics of an offer for an offered merchandise item and for receiving and storing from the at least one buyer characteristics of an offer for a desired merchandise item;
   f) the central application server having program code to group buyers based upon the sets of buyer characteristics, to group the sellers based upon the sets of seller characteristics, to group merchandise items based upon the sets of merchandise characteristics, to compare the sets of merchandise characteristics of the seller's offered merchandise against the set of acceptable merchandise characteristics by the buyer so as to determine a match between buyer's desired merchandise item and seller's offered merchandise item, to compare the buyer's sets of buyer characteristics and the acceptable seller characteristics against the seller's acceptable buyer characteristics and the sets of seller characteristics, respectively, so as to determine a match between buyer and seller, and if there is a match between buyer's desired merchandise item and seller's offered merchandise item and a match between the buyer and seller, trying to bind a contract and to complete a sale transaction between the buyer and the seller by trading from the seller to the buyer by shipping the merchandise to the buyer from the seller if there is a merchandise match and a buyer/seller match.

13. The merchandise trading system of claim 12 wherein the set of acceptable merchandise characteristics by the buyer includes bid price, the set of merchandise characteristics by the seller includes an ask price, the central application server having program code for calculating a gap price by subtracting the bid price from the ask price and for dividing the gap price between the buyer and the seller, and for using the gap price to determine if the requirement of issuing a transaction contract to bind the buyer, seller and carrier has been met, and for dividing the gap price between the buyer and seller.

14. The merchandise trading system of claim 12 further comprising a shipping service database for receiving/retrieving and storing from at least one carrier a set of carrier characteristics and from the central application server further carrier characteristics wherein the central application server further has program code for comparing the set of acceptable merchandise characteristics by the buyer, the merchandise characteristics by the seller and the carrier characteristics so as to determine a match between the buyer's desired merchandise item, seller's offered merchandise item and the carrier.

15. The merchandise trading system of claim 14 wherein the set of acceptable merchandise characteristics by the buyer includes buyer's shipping requirements, the set of merchandise characteristics by the seller includes the seller's shipping requirements, and the carrier characteristics includes the characteristics and price of the offered shipping service.

16. The merchandise trading system of claim 15 wherein the central application server further has program code for adding the shipping price to the asking price and subtracting the bid price to result in a gap price, and the central application server further uses the gap price to determine if the requirement of issuing a transaction contract to bind the buyer, seller and carrier has been met, and the said gap price being divided between the buyer, the seller and the carrier.

17. The merchandise trading system of claim 16 wherein the completed transaction to ship the merchandise from seller to the buyer is associated with a final fee, and wherein the central application server further has program code for calculating the final fee by adding to the gap price fees associated with the transaction including a shipping price, a commission price and a tax price, and for subtracting from the gap price discount fees associated with the transaction including coupons and store credit.

18. The merchandise trading system of claim 12 further comprising carriers to ship the merchandise, wherein the central application server further has program code for providing the carriers the characteristics of the grouped buyers, grouped sellers and grouped merchandise, and for holding an auction among the carriers to compete to provide the shipping services of the merchandise between the sellers and the buyers.

19. The merchandise trading system of claim 12 wherein the buyer's buyer characteristics include the characteristic of how much money the buyer is willing to place as a down payment and the seller's acceptable buyer characteristics include the down payment requirement by the seller.

20. The merchandise trading system of claim 12 wherein the buyer characteristics and seller characteristics provided by the merchandise trading system include the statistics of previous history of transaction behavior and feedback rating from counter parties, and further wherein the merchandise characteristics include ratings from users or other third party sources, and further wherein the rating for users and merchandise are double-ranked to determine the effectiveness of the rating being weightened by the creditability of a rater.

21. The merchandise trading system of claim 12 wherein the buyer's acceptable merchandise characteristics or the seller's merchandise characteristics includes an option of future execution time of the transaction.

22. The merchandise trading system of claim 12 wherein the seller is a service provider and buyer is a service receiver and further wherein the merchandise comprises the following services: a shipping service, a communication service, a media service, a news service, an entertainment service, an advertisement service, a healthcare service, or a brokerage service.

23. A computer readable medium for allowing grouped sellers to sell grouped merchandise to grouped buyers via a merchandise trading system, the computer readable medium comprising program instructions for:

a) in a user database, for receiving and storing from at least one buyer a set of buyer characteristics, a set of acceptable seller characteristics and a set of acceptable merchandise characteristics for a desired merchandise item and for receiving and storing from at least one seller a set of seller characteristics, a set of acceptable buyer characteristics, and for receiving from the database server further buyer characteristics and seller characteristics for the at least one buyer and at least one seller;

b) in a merchandise database, for receiving and storing from the at least one seller a set of merchandise characteristics and receiving and storing from the trading system a set of merchandise characteristics;

c) in an offer/order database, for receiving and storing from the at least one seller characteristics of an offer for an offered merchandise item and for receiving and storing from the at least one buyer characteristics of an offer for a desired merchandise item;

d) in the central application server, to group the buyers based upon the sets of buyer characteristics, to group the sellers based upon the sets of seller characteristics, to group merchandise items based upon the sets of merchandise characteristics, to compare the set of merchandise characteristics of the seller's offered merchandise against the set of acceptable merchandise characteristics by the buyer so as to determine a merchandise match between buyer's desired merchandise item and seller's offered merchandise item, to compare the buyer's sets of buyer characteristics and the acceptable seller characteristics against the seller's acceptable buyer characteristics and the sets of seller characteristics, respectively, so as to determine a buyer/seller match between buyer and seller, and if there is a merchandise match and a buyer/seller match to bind a contract and to complete a sale transaction between the buyer and the seller by trading from the seller to the buyer by shipping the merchandise to the buyer from the seller if there is a merchandise match and a buyer/seller match.

24. The computer readable medium of claim 23 wherein the set of acceptable merchandise characteristics by the buyer includes a bid price, the set of merchandise characteristics by the seller includes an ask price, the central application server having program code for calculating a gap price by subtracting the bid price from the ask price and for dividing the gap price between the buyer and the seller, using the gap price to determine if the requirement of issuing a transaction contract to bind the buyer, seller and carrier has been met, and dividing the gap price between the buyer and seller.

25. The computer readable medium of claim 23 further comprising program instructions, in a shipping service database, for receiving/retrieving and storing from at least one carrier a set of carrier characteristics and from the central application server further carrier characteristics, for comparing the set of acceptable merchandise characteristics by the buyer, the merchandise characteristics by the seller and by the trading system and the carrier characteristics so as to determine a match between the buyer's desired merchandise item, seller's offered merchandise item and the carrier.

26. The computer readable medium of claim 25 wherein the merchandise comprises an offered shipping service, the set of acceptable merchandise characteristics by the buyer includes buyer's shipping requirements, the set of merchandise characteristics by the seller includes the seller's shipping requirements, and the carrier characteristics includes the characteristics and price of the offered shipping service.

27. The computer readable medium of claim 26 further having program instructions, in the central application server, for adding the shipping price to the asking price and subtracting the bid price to result in a gap price, using the gap price to determine if the requirement of issuing a transaction contract to bind the buyer, seller and carrier has be met, and dividing the gap price between the buyer, the seller and the carrier.

28. The computer readable medium of claim 27 wherein the completed transaction to move the merchandise from seller to the buyer is associated with a final fee, and wherein, in the central application server, the computer readable medium further comprises program instructions for calculating the final fee by adding to the gap price fees associated with the transaction including the shipping price, a commission price and a tax price, and for subtracting from the gap price discount fees associated with the transaction including coupons and store credit.

29. The computer readable medium of claim 23 further comprising, in the central application server, having program instructions for providing carriers to ship the merchandise, the characteristics of the grouped buyers, grouped sellers and grouped merchandise, and for holding an auction among the carriers to compete to provide the shipping services of the merchandise between the sellers and the buyers.

30. The computer readable medium of claim 23 wherein the buyer's buyer characteristics include the characteristic of how much money the buyer is willing to place as a down payment, and the seller's acceptable buyer characteristics include the down payment requirement by the seller.

31. The computer readable medium of claim 23 wherein the buyer characteristics and seller characteristics provided by the merchandise trading system include the statistics of previous history of transaction behavior and feedback rating from counter parties, and further wherein the merchandise characteristics include ratings from users or other third party sources, and further wherein the ratings for users and merchandise are double-ranked to determine the effectiveness of the ratings as being weightened by the creditability of a rater.

32. The computer readable medium of claim 23 wherein the buyer's acceptable merchandise characteristics or the seller's merchandise characteristics both include an option of future execution time of the transaction.

33. The computer readable medium of claim 23 wherein the seller is a service provider and buyer is a service receiver and further wherein the merchandise is a shipping service, a communication service, a media service, a news service, an entertainment service, an advertisement service, a healthcare service, or a brokerage service.

\* \* \* \* \*